United States Patent
Zugen et al.

(10) Patent No.: US 11,845,172 B2
(45) Date of Patent: Dec. 19, 2023

(54) POWER HEAD CONFIGURED TO OPERATE MULTIPLE TOOL HEADS WITH UNIVERSAL ROTARY DEVICE

(71) Applicant: HUSQVARNA AB, Huskvarna (SE)

(72) Inventors: Ni Zugen, Suzhou (CN); Yang Ming, Suzhou (CN); Li Li, Suzhou (CN); Chad Jones, Mount Holly, NC (US); Garrett Sherman, Huntersville, NC (US); Jeffrey C. Hickman, Concord, NC (US); David Lawrence Estey, Huntersville, NC (US)

(73) Assignee: HUSQVARNA AB, Huskvarna (SE)

( * ) Notice: Subject to any disclaimer, the term of this patent is extended or adjusted under 35 U.S.C. 154(b) by 376 days.

(21) Appl. No.: 16/770,125

(22) PCT Filed: Dec. 6, 2017

(86) PCT No.: PCT/CN2017/114874
§ 371 (c)(1),
(2) Date: Jun. 5, 2020

(87) PCT Pub. No.: WO2019/109279
PCT Pub. Date: Jun. 13, 2019

(65) Prior Publication Data
US 2020/0346335 A1    Nov. 5, 2020

(51) Int. Cl.
*A01G 20/47*    (2018.01)
*B25F 3/00*    (2006.01)
(Continued)

(52) U.S. Cl.
CPC ............ *B25F 3/00* (2013.01); *B25F 5/02* (2013.01); *A01D 34/416* (2013.01); *A01G 3/062* (2013.01); *A01G 20/47* (2018.02)

(58) Field of Classification Search
CPC .. B25F 3/00; B25F 5/02; A01D 34/416; A01G 20/47; A01G 3/062; A01G 3/06
(Continued)

(56) References Cited

U.S. PATENT DOCUMENTS

| 6,675,911 B2 * | 1/2004 | Driessen | B25F 3/00 173/171 |
| 2013/0118767 A1 * | 5/2013 | Cannaliato | B25F 3/00 173/29 |

(Continued)

FOREIGN PATENT DOCUMENTS

| CN | 2582346 | * 10/2003 |
| CN | 103448036 A | * 12/2013 |

(Continued)

OTHER PUBLICATIONS

International Search Report and Written Opinion for International Application No. PCT/CN2017/114874 dated Aug. 29, 2018.
(Continued)

*Primary Examiner* — Nhat Chieu Q Do
(74) *Attorney, Agent, or Firm* — Burr & Forman LLP

(57) ABSTRACT

A multi-tool (100) includes a power head (120) including a power head housing (122) having a handle (124) operably coupled thereto, a tool attachment (106, 108, 110) configured to perform a work function, the tool attachment (106, 108, 110) being alternately separable from and operably coupled to the power head (120), a motor (140) disposed in the power head housing (122), a battery (130) configured to be operably coupled to the motor (140) to selectively power the motor (140), a drive provider portion (300) disposed at the power head (120), and a drive receiver portion (320) disposed at the tool attachment (106, 108, 110). The drive provider portion (300) includes a driving portion (302) of a shaft (150) operably coupled to the motor (140), and the drive receiver portion (320) includes a driven portion (322)

(Continued)

of the shaft (150). The driving portion (302), the drive receiver portion (320), and the motor (140) share a common axis (148). The power head (120) receives the battery (130) at an opposite end of the power head housing (122) relative to an end of the power head housing (122) at which the motor (140) is located, and the handle (124) extends from a first portion of the power head housing (122) above the motor (140) to a second portion of the power head housing (122) above the battery (130).

9 Claims, 15 Drawing Sheets

(51) Int. Cl.
*B25F 5/02* (2006.01)
*A01D 34/416* (2006.01)
*A01G 3/06* (2006.01)

(58) Field of Classification Search
USPC .......................................................... 173/29
See application file for complete search history.

(56) References Cited

U.S. PATENT DOCUMENTS

| 2014/0332243 | A1* | 11/2014 | Baskar | ...................... B25F 5/02 173/29 |
| 2018/0104809 | A1* | 4/2018 | Dyer | .................... B27B 17/0016 |
| 2020/0147778 | A1* | 5/2020 | Tam | ..................... B23D 49/162 |

FOREIGN PATENT DOCUMENTS

| CN | 103448036 A | 12/2013 |
| CN | 107426964 A | 12/2017 |
| CN | 107438501 A | 12/2017 |
| JP | 2009072150 A | 4/2009 |

OTHER PUBLICATIONS

International Preliminary Report on Patentability for International Application No. PCT/CN2017/114874 dated Jun. 9, 2020.

* cited by examiner

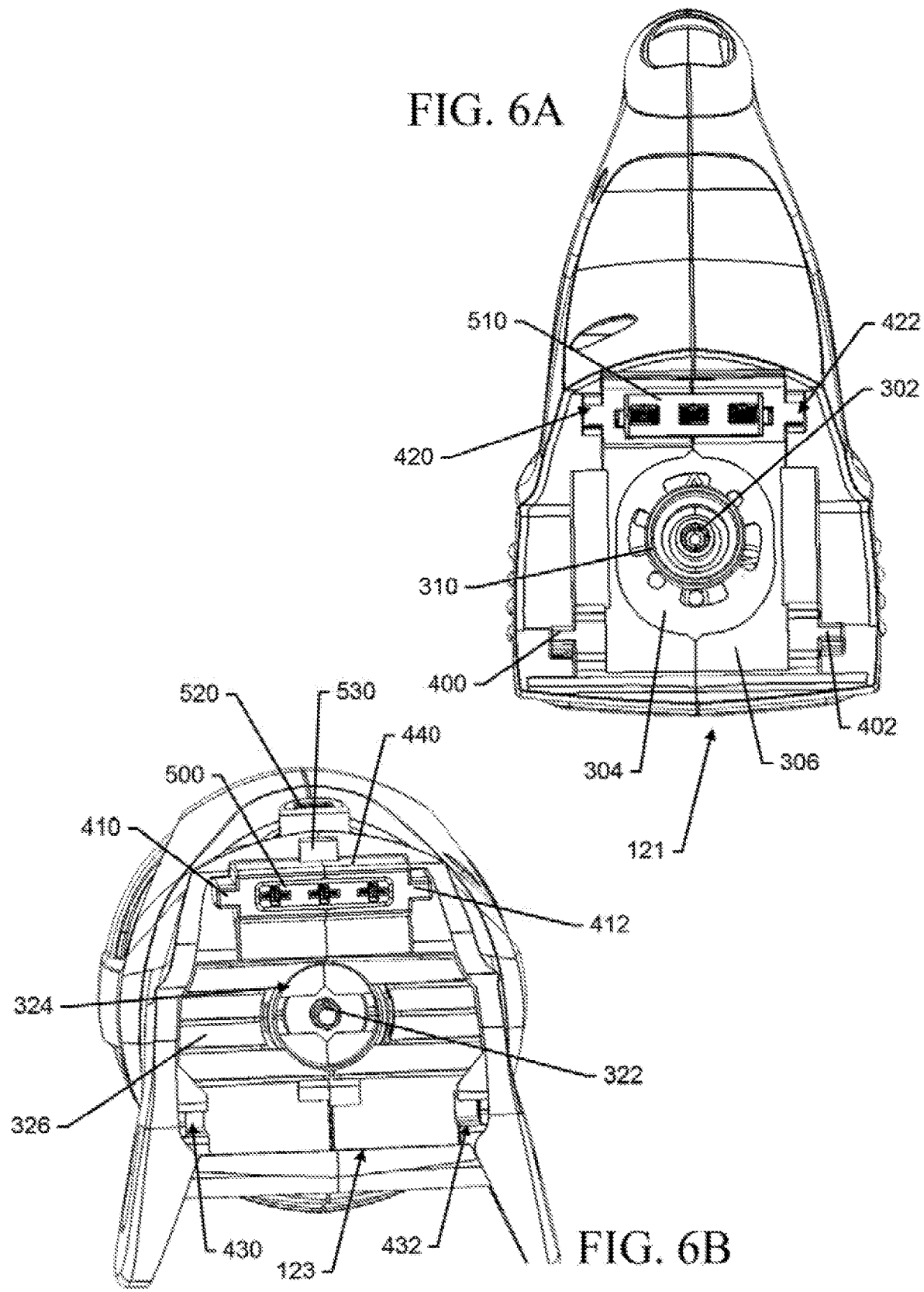

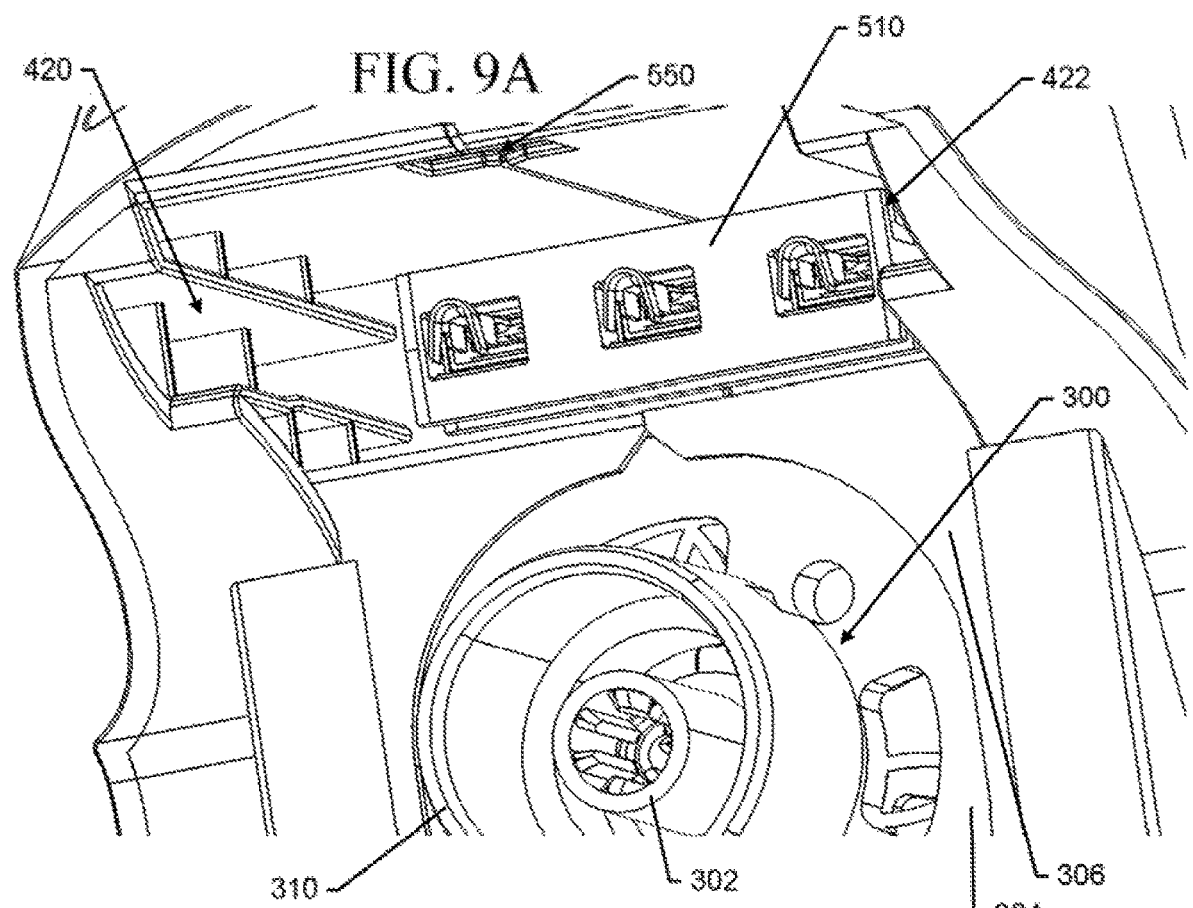
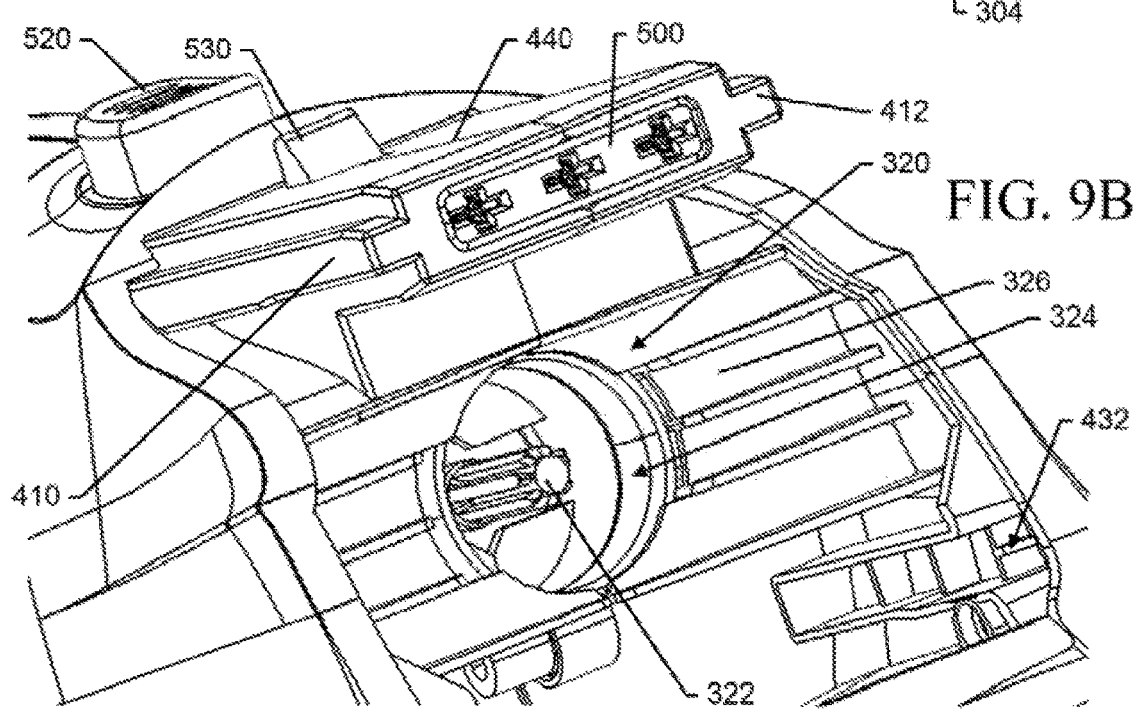

POWER HEAD CONFIGURED TO OPERATE MULTIPLE TOOL HEADS WITH UNIVERSAL ROTARY DEVICE

TECHNICAL FIELD

Example embodiments generally relate to battery powered, outdoor power equipment and, more particularly, relate to a battery powered power head that can be interchangeable with a number of different tool heads.

BACKGROUND

Outdoor power equipment includes such devices as mowers, trimmers, edgers, chainsaws, blowers and the like. These devices are often used to perform tasks that inherently require the devices to be mobile. Accordingly, these devices are typically made to be relatively robust and capable of handling difficult work in hostile environments, while balancing the requirement for mobility.

Powering such devices could be accomplished in any number of ways. However, for outdoor power equipment that is intended to be handheld, size and weight become important considerations. In some applications, the emissions (i.e., in terms of noise and/or pollutants) generated by the device may also become an important consideration. To reduce emissions, such outdoor power equipment may be selected for employment with electric motors that could employ battery or mains power supplies.

Particularly when battery power supplies are used, mobility and usability can often be dramatically enhanced. Thus, a number of battery powered tools have come onto the market. In an effort to create an ecosystem of products, some manufacturers have adopted a policy of making a single battery usable in a number of different tools. As such, one battery could power each of a trimmer, edger, chainsaw and/or blower. However, even in this paradigm, it is common for each different device to be its own tool that has only an interchangeable battery. While the battery may therefore be useable in each of several different devices, the rest of the device may be entirely uniquely designed, thereby increasing cost and requiring users to acclimate themselves to completely different devices after they plug in the same battery.

BRIEF SUMMARY OF SOME EXAMPLES

Some example embodiments may therefore provide an entire power head that can be interchangeable with a number of different devices. The battery may still plug into the power head, but much less of the remainder of the device (i.e., just the working assembly and perhaps some additional support structure and electronics) may need to be manufactured separately because one power head can be reused with many other devices. Production costs for devices may therefore be lowered, and customer satisfaction may be increased because their familiarity with controls of the power head may enable them to enjoy usage of familiar controls on multiple devices.

In accordance with an example embodiment, a multi-tool is provided. The multi-tool includes a power head including a power head housing having a handle operably coupled thereto, a tool attachment configured to perform a work function and that is alternately separable from and operably coupled to the power head, a motor disposed in the power head housing, a battery configured to be operably coupled to the motor to selectively power the motor, a drive provider portion disposed at the power head, and a drive receiver portion disposed at the tool attachment. The drive provider portion includes a driving portion of a shaft operably coupled to the motor, and the drive receiver portion includes a driven portion of the shaft. The driving portion, the drive receiver portion, and the motor share a common axis. The power head receives the battery at an opposite end of the power head housing relative to an end of the power head housing at which the motor is located, and the handle extends from a first portion of the power head housing above the motor to a second portion of the power head housing above the battery.

In another example embodiment, a power head for providing power for a multi-tool is provided. The power head may include a power head housing having a handle operably coupled thereto, a motor disposed in the power head housing, a battery configured to be operably coupled to the motor to selectively power the motor, and a drive provider portion disposed at the power head. The drive provider portion includes a driving portion of a shaft operably coupled to the motor. The drive provider portion is configured to be operably coupled to a drive receiver portion disposed at a tool attachment. The driving portion and the motor share a common axis. The power head receives the battery at an opposite end of the power head housing relative to an end of the power head housing at which the motor is located. The handle extends from a first portion of the power head housing above the motor to a second portion of the power head housing above the battery.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 6A is a front view of the power head in isolation in accordance with an example embodiment;

FIG. 6B illustrates a rear view of the blower attachment in isolation in accordance with an example embodiment;

FIG. 9A illustrates a close in, perspective view of the mating interface of the power head in accordance with an example embodiment;

FIG. 9B is a close in, perspective view of the mating interface of the blower attachment in accordance with an example embodiment;

DETAILED DESCRIPTION

Figure 1:
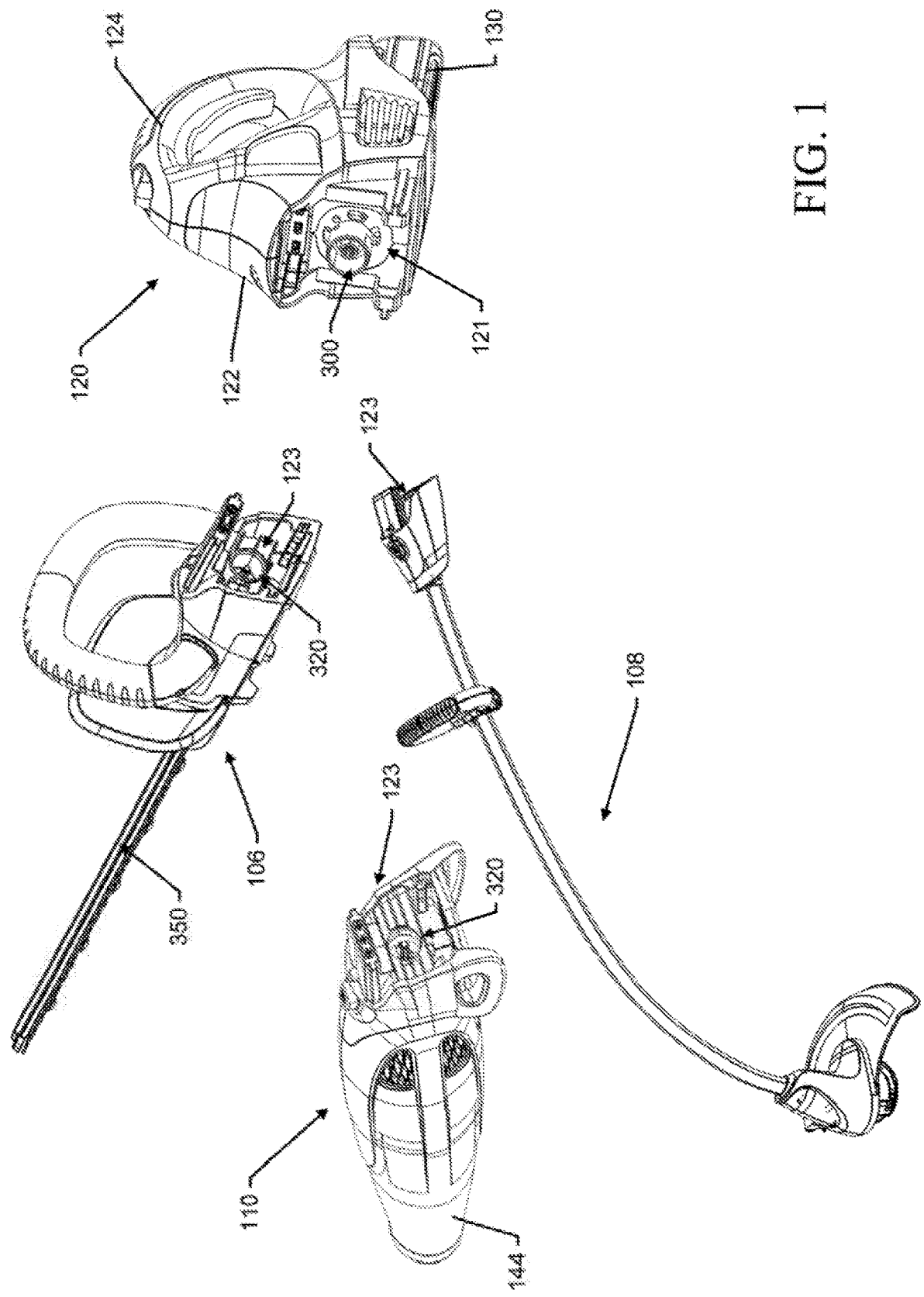
FIG. 1 illustrates a perspective view of a multi-tool including a power head and multiple tool attachments in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As mentioned above, a typical battery powered device tends to have a predefined function. Even if the battery is interchangeable to multiple devices, the entire device body and electronics of the powered device typically have to be separately produced. Example embodiments provide a common power head that is configured to receive a battery and have basic control electronics, actuation components, rear handle, and the motor all in one container (i.e., the power head housing). The power head can then generate a universal driving rotary output, which can be used directly (to power a coaxial rotary working assembly), or converted into a non-rotary output (e.g., a linear output) or a rotary output that is not coaxial with the universal driving rotary output (e.g., a rotary output for which the working assembly rotates in a plane that is not parallel to the plane of operation of the universal driving rotary output).

When providing such a device, one might expect that the universal driving rotary output could power many different working assemblies including, for example, line trimmers, hedge trimmers, saws, and blowers. However, it must be appreciated that the weight and structure (and therefore the weight distribution) of each different working assembly can be vastly different. Thus, the structure and arrangement of components chosen for the power head is potentially very impactful. A design that is optimal for one device (e.g., a blower) may be suboptimal from the perspective of ergonomics on a different device (e.g., a line trimmer). As such, placement of the motor beneath a front portion of the handle of the power head and the battery under a rear portion of the handle tends to provide a good weight distribution that works well with a number of different working assemblies. In particular, placement of the battery into a rear portion of the power head with a direction of insertion that is substantially parallel to the axis of rotation of the universal driving rotary output is particularly beneficial. Moreover, in some cases, a longitudinal centerline of the battery may actually be coaxial with the axis of rotation of the universal driving rotary output. As a result, a relatively light weight and ergonomically well balanced multi-tool may be provided.

To achieve a multi-tool that is both ergonomically balanced, but also of a size and weight that is not restrictive to users, some example embodiments described herein provide structures for providing a multi-tool that fundamentally alters the ordering and positioning of components of the multi-tool. In this regard, for example, the motor, the battery and a center of gravity of the working assembly may all be substantially equidistant from each other along a common axis. The centers of gravity of each of the main contributors to the weight of the multi-tool may therefore be distributed relative to the handle in such a way as to provide a relatively light, but still powerful and easy to handle multi-tool in any configuration. As such, the relative positioning of the various components described herein can, in some cases, provide significant advantages in terms of providing versatility, maneuverability, and power all in a very ergonomically advantageous and lightweight package.

FIG. 1 illustrates a perspective view of various components of a multi-tool 100 of an example embodiment. The multi-tool 100 may include any of a number of different tool attachments including, for example, a hedge trimmer attachment 106, a string trimmer attachment 108 and a blower attachment 110. Each of the tool attachments may be configured to be connectable to an instance of a power head 120. The power head 120 may have a power head mating interface 121 that is configured to be operably coupled to any one of the hedge trimmer attachment 106, the string trimmer attachment 108 or the blower attachment 110 at any given time. To accomplish this flexibility, each of the hedge trimmer attachment 106, the string trimmer attachment 108 and the blower attachment 110 may employ a respective instance of a tool mating interface 123. The structures of the tool mating interface 123 may be substantially similar regardless of which one of the hedge trimmer attachment 106, the string trimmer attachment 108 and the blower attachment 110 the tool mating interface 123 is instantiated on to enable the power head 120 to drive each respective tool attachment. It may also be possible to define other attachments as well so long as such attachments can be powered by the power head 120 and therefore have an instance of the tool mating interface 123.

As shown in FIG. 1, the power head 120 may include a power head housing 122 inside which various components of the power head 120 are housed. Similarly, given that each instance of tool attachments shown results in the multi-tool 100 being comprised of two separable pieces, it should be appreciated that the tool attachments may also include respective housings for housing various respective components thereof. In some cases, each of the housings may be formed of two pieces that fit together to form the housing when joined. The housings (e.g., both the power head housing 122 and the housings of any of the respective tool attachments) may be formed of plastic, composite materials, metals or any other desirable materials. In an example embodiment, the housings may each be formed of two or more molded pieces that can be fit together. In some cases, the molded pieces may form half-shells (e.g., right and left half-shells) that can be affixed to each other via welding, adhesives, snap fittings, fixing members (e.g., screws), and/or the like. When molded pieces are fit together, they may form a seam at the location of joining between the molded pieces.

Figure 2:
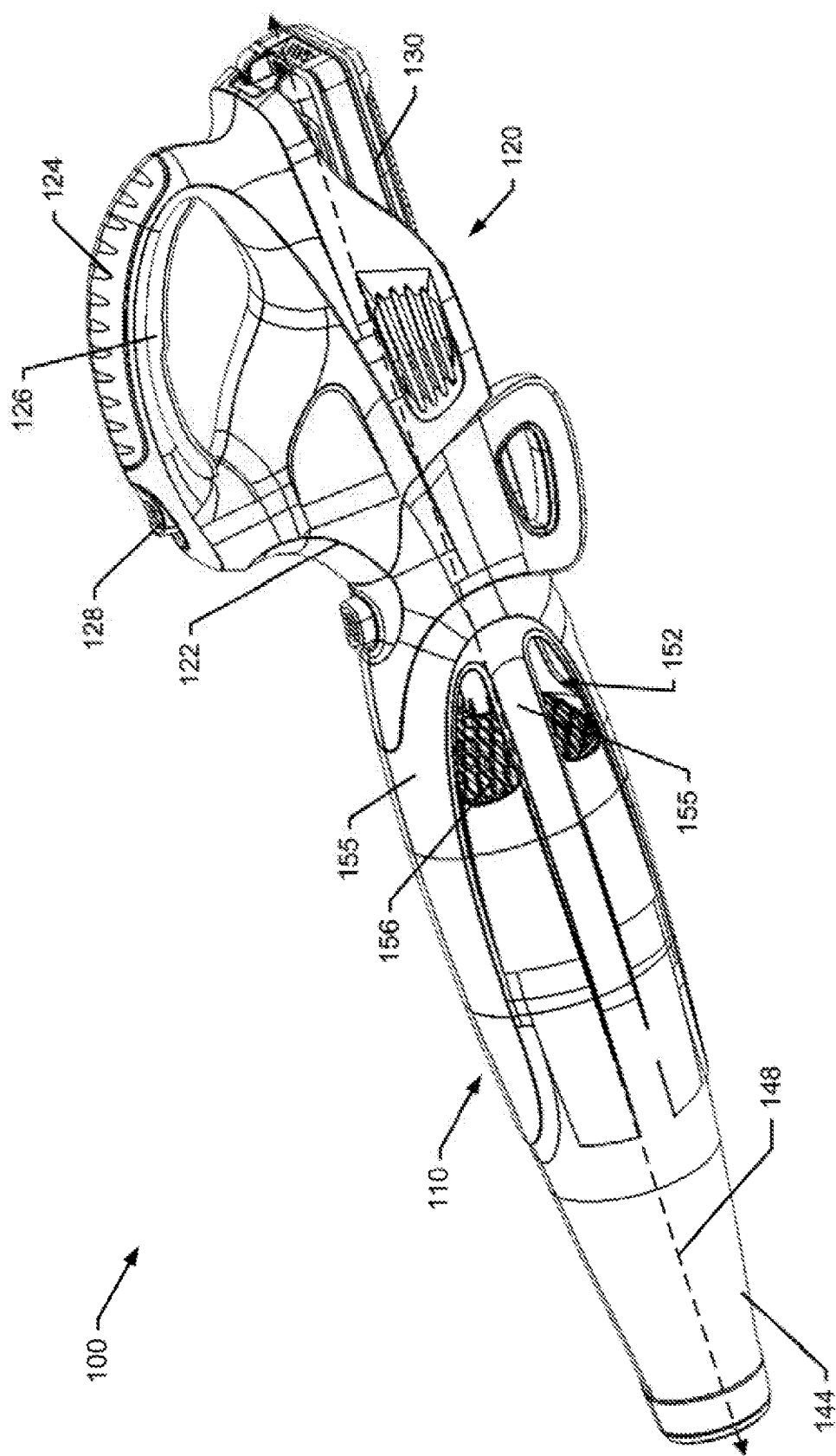
FIG. 2 illustrates a side perspective view of the multi-tool with a blower attachment in accordance with an example embodiment.
Figure 3:
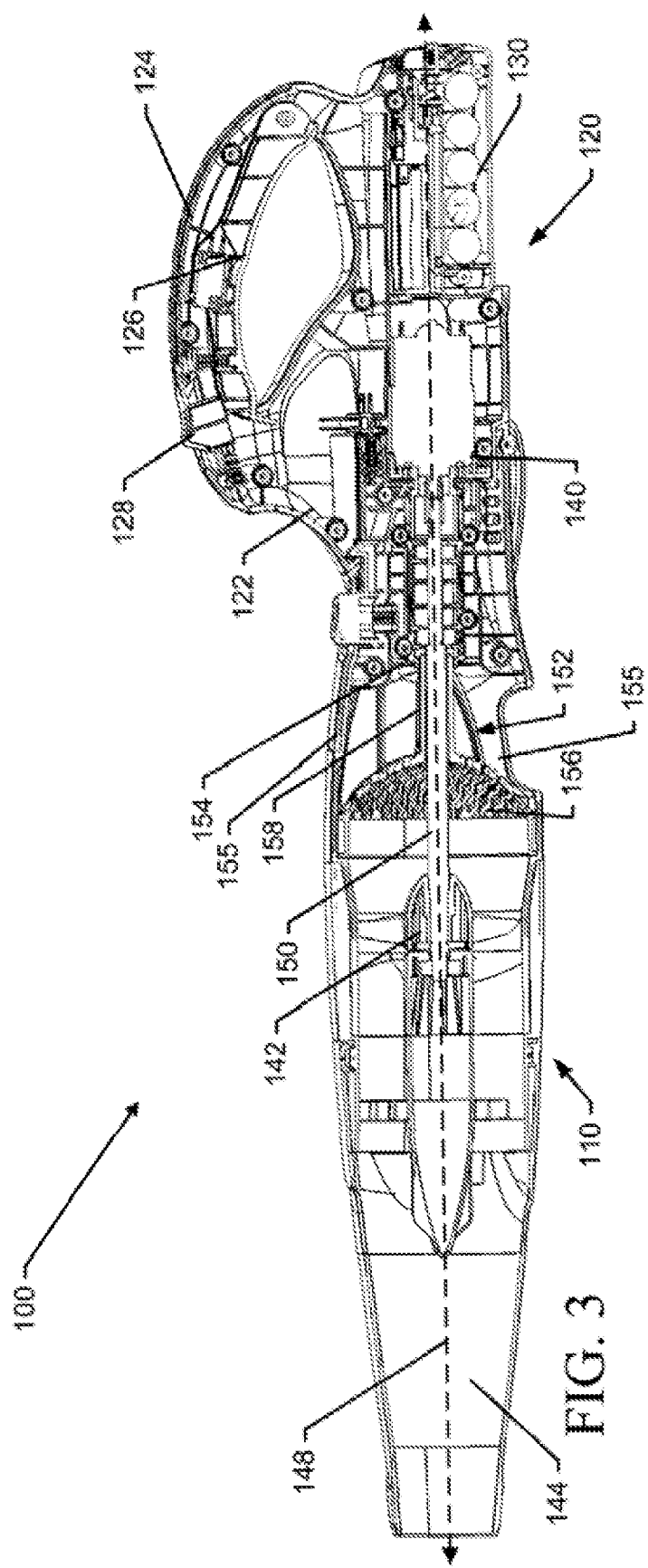
FIG. 3 illustrates a cross section view of the multi-tool with blower attachment in accordance with an example embodiment.

Given that the power head housing 122 is configured to be separable from each other housing (of the tool attachments), it should be further appreciated that the power head housing 122 may be configured to form a nearly continuous shell when joined with the housing of any one of the tool attachments. Thus, for example, when the power head mating interface 121 is joined with the tool mating interface 123 of any of the tool attachments, a nearly continuous shell (albeit with a visible seam therebetween) may be formed. FIG. 2 illustrates a side perspective view of the power head 120 fit together with the blower attachment 110 such that the power head mating interface 121 is joined with the tool mating interface 123 (thereby rendering each interface no longer visible). FIG. 3 illustrates a cross section view of the power head 120 fit together with the blower attachment 110 such that the power head mating interface 121 is joined with the tool mating interface 123 to further illustrate the joining and also to illustrate some internal components thereof.

In an example embodiment, a handle 124 of the multi-tool 100 may be formed integrally into the power head housing 122 at a top portion of the power head housing 122 (with "top" and all other directions being referenced to the orientation of the multi-tool 100 to the ground and the normal way the multi-tool 100 is held by a user during operation). In an example embodiment, the handle 124 may include an operating member 126 (e.g., a trigger or presence lever) that may be operated by one or more fingers of the operator while the operator holds the handle 124. A power button 128 may also be provided to enable electrical power to be providable from a battery 130 to a motor 140 (see FIG. 3) when the power button 128 is in the "on" position, and prevent any provision of power to the motor 140 when the power button 128 is in the "off" position. Actuation of the operating member 126 may cause power from the battery 130 to be selectively applied to the motor 140 to turn the motor 140 based on control provided by the control unit. In some cases, the control unit may include interlocks, protective functions or other control mechanisms that may sense various conditions of the multi-tool 100 via sensors, switches or other mechanisms in order to selectively control the application of power to the motor 140 based on indications of user intent (e.g., via actuation of the operating member 126) and/or determinations regarding the state of the multi-tool 100 as provided by the sensors, switches or other mechanisms.

It should be appreciated that although FIG. 1 shows an example in which the operating member 126 is used for selective powering of the motor 140, other example embodiments may employ a selector, switch, button or other such operative member in order to selectively control operation of the motor 140. Thus, for example, in some cases, the operating member 126 could instead be a presence indicator or lever that is required to be depressed for powering the motor 140 responsive to application of power from the power button 128 based on the on/off position thereof. Thus, for example, if the power button 128 is in the on position while no operator has positive control of the multi-tool 100 (as indicated by the fact that the operating member 126 is not actuated), then the multi-tool 100 will not operate. Speed control or other operable functions for controlling the motor 140 may be performed using an operative member of any desirable form, and the operating member 126 is just one example.

The motor 140 or power unit of the multi-tool 100 is configured to provide the driving force that can be transferred to the selected one of the tool attachments to perform a corresponding working function via the working assembly that is associated with the selected one of the tool attachments. For example, in the case of the blower attachment 110 shown in FIGS. 2 and 3, the motor 140 provides a rotary output that is directly transferred to the blower attachment 110 to providing a rotary work output at a fan 142 to move air through the multi-tool 100 and out a blower tube 144 of the blower attachment 110. In some embodiments, the power unit may be a three phase electric motor (or DC motor) that is operated under the control of a control unit or control circuitry that may be housed in the power head housing 122. The motor 140 may be powered by the battery 130 (or battery pack) when the battery 130 is inserted into a rear portion of the power head housing 122 to connect electrical contacts of the battery 130 to corresponding electrical contacts of the power head housing 122 as described in greater detail below.

In some embodiments, the control unit may be housed in its own portion of the power head housing 122 above or otherwise proximate to the location of the motor 140. The portion of the power head housing 122 in which the control unit is housed may be referred to as a control unit housing portion, and the control unit housing portion may be an integral part of a half-shell (as described above) or may be a separate housing portion that is joined to other housing portions. The control unit housing portion may be disposed proximate to a portion of the power head housing 122 near which the handle 124 of the power head 120 is provided (e.g., forward of and below the handle 124).

As discussed above, the power head mating interface 121 is joined with the tool mating interface 123 to form a complete and operational multi-tool 100. However, the multi-tool 100 can be reconfigured by releasing the tool mating interface 123 for a particular one of the tool attachments and replacing it with another tool mating interface 123 of a different tool attachment. Since FIGS. 2 and 3 illustrate an example of the mating of the tool mating interface 123 of the blower attachment 110 with the power head mating interface 121 of the power head 120, a brief discussion of the resulting multi-tool 100 configuration from this arrangement will now be described in order to explain the general functioning of the completed multi-tool 100 configuration of this example.

As shown in FIG. 3, the fan 142 of the blower attachment 110 may be provided in a blower tube 144 that defines a portion of the blower attachment housing. Thus, according to this example, the fan 142 is located in a different housing portion (i.e., the blower attachment housing) than the housing portion (i.e., the power head housing 122) in which the motor 140 is housed and to which the battery 130 mates. The blower tube 144 may be formed as a substantially tapering, hollow cylinder (e.g., a frustoconical tube) that is formed about a blower tube axis and extends away from the power head 120, forward of the fan 142. The blower tube axis may be coaxial with an axis of the fan 142, and an axis of the motor 140 to define a common axis 148. In some embodiments, a longitudinal axis of the battery 130 may also substantially align with the common axis 148. Alternatively, the longitudinal axis of the battery 130 may extend parallel to the common axis 148, but may be slightly below the common axis 148 when the battery 130 is inserted into and mated with the power head 120.

A shaft 150 may pass from the motor 140 to the fan 142 to translate rotation of the motor 140 to the fan 142. The shaft 150 may be aligned with the common axis 148 and may be coaxial with the common axis 148. As can be appreciated from FIG. 3, the shaft 150 must be capable of being split at some point to enable the power head mating interface 121 to be separated from the tool mating interface 123 of the blower attachment 110 to allow the power head mating interface 121 to be joined to another tool attachment. Accordingly, the two split portions of the shaft 150 must be further capable of being operably coupled to each other when the power head mating interface 121 is joined with the tool mating interface 123 (of whatever tool attachment is selected).

For the blower attachment 110, the shaft 150 must therefore pass through an intake chamber 152 that is formed in the blower attachment housing. Thus, air that is to be passed through the blower attachment 110 is drawn into the multi-tool 100 at a location that is between the motor 140 and the fan 142. Moreover, the location at which air is drawn into the multi-tool 100 is a partially enclosed chamber (i.e., the intake chamber 152) that is structured to mute the noise of either the motor 140 or the fan 142 to keep the multi-tool 100 operating relatively quietly from the perspective of the operator. In this regard, the intake chamber 152 may include a rear wall 154 that is disposed at a rear end of the intake chamber 152 and sidewall members 155 that extend forward from the rear wall 154 to define the sides of the intake chamber 152. An intake screen 156 may be disposed opposite the rear wall 154 to define a front boundary of the intake chamber 152. The intake screen 156 of this example curves backward toward the rear wall 154 forming a spherical cap or dome shaped screen through which air is allowed to pass as the air travels from the intake chamber 152 into the chamber in which the fan 142 is located within the blower tube 144. Louvers or other air inlets are formed between the sidewall members 155 to enable air to be drawn therethrough into the intake chamber 152.

At least one of the sidewall members 155 may be substantially wider than others, and may be disposed at a top portion of the intake chamber 152. This particular top one of the sidewall members 155 deflects sound downward toward one of the louvers or air inlets that is also larger than others, and is disposed opposite the top one of the sidewall members 155. This structure deflects sound downward and away from the operator. Meanwhile, the sidewall members 155 also provide additional support for the structure of the blower attachment 110 to prevent bending of the shaft 150 and enable, for a two piece and separable construction, a robust interface to be defined between the blower attachment 110 and the power head 120.

The blower tube 144 may include an inlet portion disposed proximate to the fan 142 and an outlet. The outlet may be at a distal end of the blower tube 144, opposite the inlet portion. Given that the operator typically holds the multi-tool 100 by the handle 124 and the remainder of the multi-tool 100 is suspended below the handle 124 with the outlet aimed in front of the operator, the handle 124 is generally considered to be at a top portion of the multi-tool 100 and the outlet is at the front, while the battery 130 is considered to be at a rear of the multi-tool 100. As mentioned above, the blower tube 144 may taper slightly (i.e., have a decreasing diameter) as the blower tube 144 extends toward the outlet. Thus, a largest diameter of the blower tube 144 may be provided at the point of the blower tube 144 that is closest to the fan 142.

In an example embodiment, the operation of the motor 140 may cause an impeller of the fan 142 to rotate (via the shaft 150) so that a low pressure area is generated to draw air into the intake chamber 152, through the intake screen 156, and to the fan 142 to be expelled from the blower tube 144 at the outlet to blow leaves, debris, or any other material. As mentioned above and as shown in FIG. 3, the motor 140, the shaft 150 and the fan 142 may each be coaxial with the blower tube 144 and the common axis 148, so that air exiting the fan 142 is generally moved (although such flow may be turbulent) along a direction substantially parallel to the common axis 148. Air entering into the intake chamber 152 may be generally drawn therein in a direction substantially perpendicular to the common axis 148, and then passed through the intake screen 156 to enter into the blower tube 144 before being expelled. Given that the intake chamber 152 and the intake screen 156 are inset within the blower attachment housing, flow noise generated by airflow over the intake screen 156 may therefore be muted inside the blower attachment housing or directed out the downward and side facing louvers. Thus, any noise emanating from the intake chamber 152 may be directed at an angle relative to the common axis 148. More specifically, any such noise may be directed downward and/or sideways either toward the ground or at least away from the operator's ears.

In an example embodiment, the shaft 150 may pass through the intake chamber 152 through an enclosed shaft housing 158. Thus, the shaft housing 158 may extend from the rear wall 154 to the intake screen 156, and may also be coaxial with the shaft 150 and the common axis 148. The shaft housing 158 may prevent debris from building up on the shaft 150, and from getting into the motor 140 via the opening through the rear wall 154 that permits the shaft 150 to pass therethrough to access the motor 140. The shaft housing 158 may also contribute to the structural rigidity of the blower attachment portion 110 to prevent bending of the shaft 150 and enable, for a two piece and separable construction, a robust interface to be defined between the blower attachment portion 110 and the power head 120.

Figure 4A:
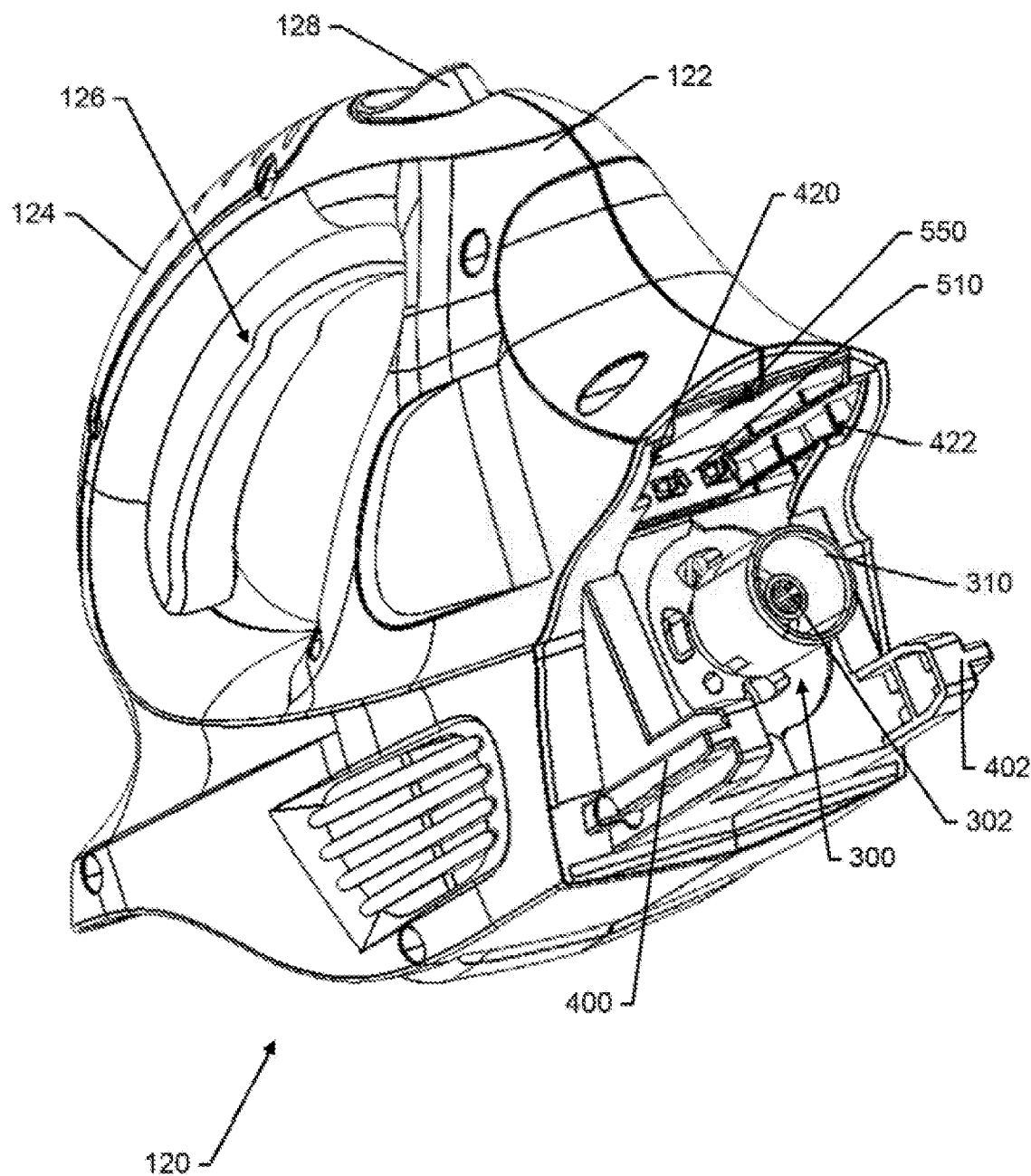
FIG. 4A illustrates a side perspective view of a power head of the multi-tool with battery removed in accordance with an example embodiment.
Figure 4B:
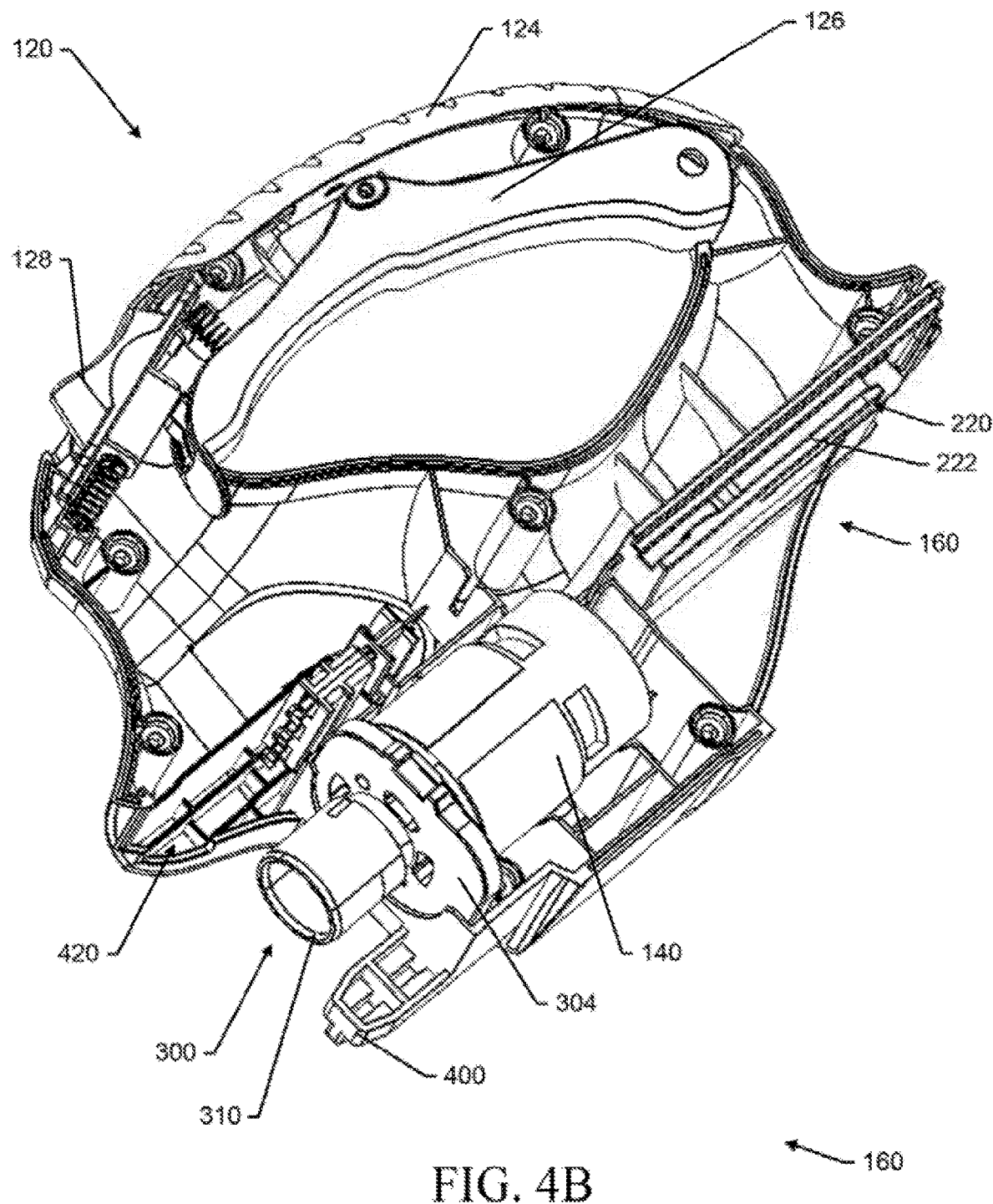
FIG. 4B illustrates a perspective view of the power head with a left side of the power head housing removed in accordance with an example embodiment.
Figure 4C:
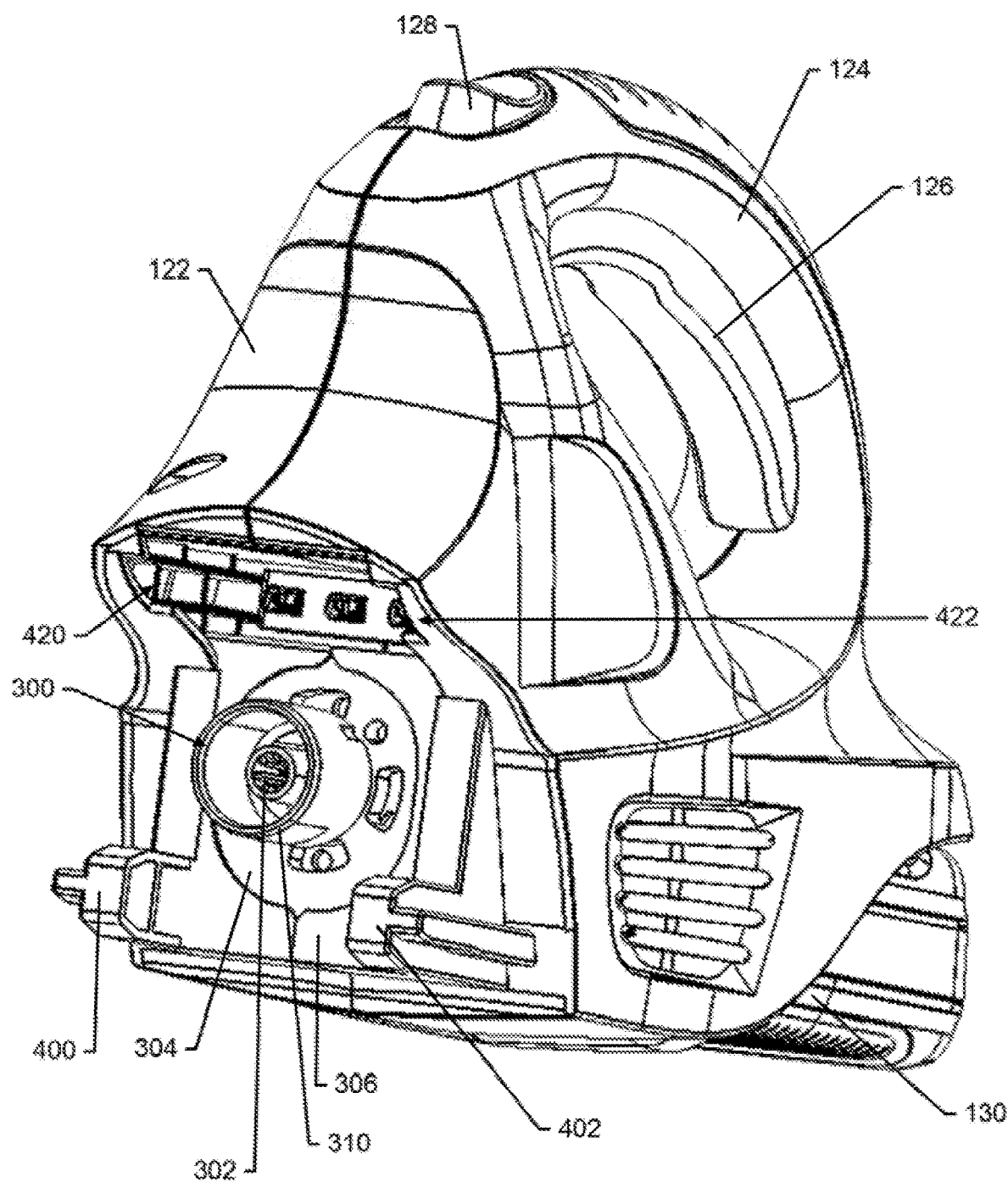
FIG. 4C illustrates a side perspective view of the power head of the multi-tool with battery installed in accordance with an example embodiment.
Figure 4D:
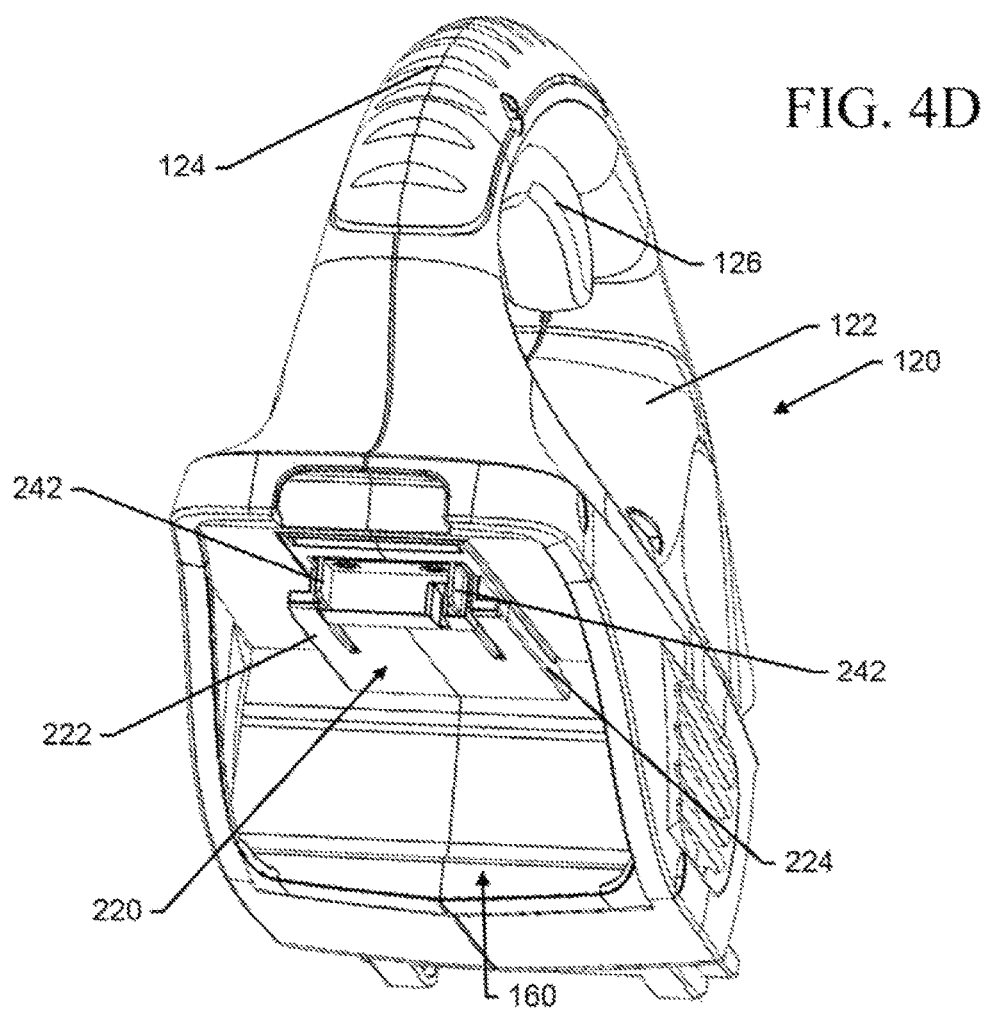
FIG. 4D is a rear perspective view of the power head with battery removed in accordance with an example embodiment.
Figure 5A:
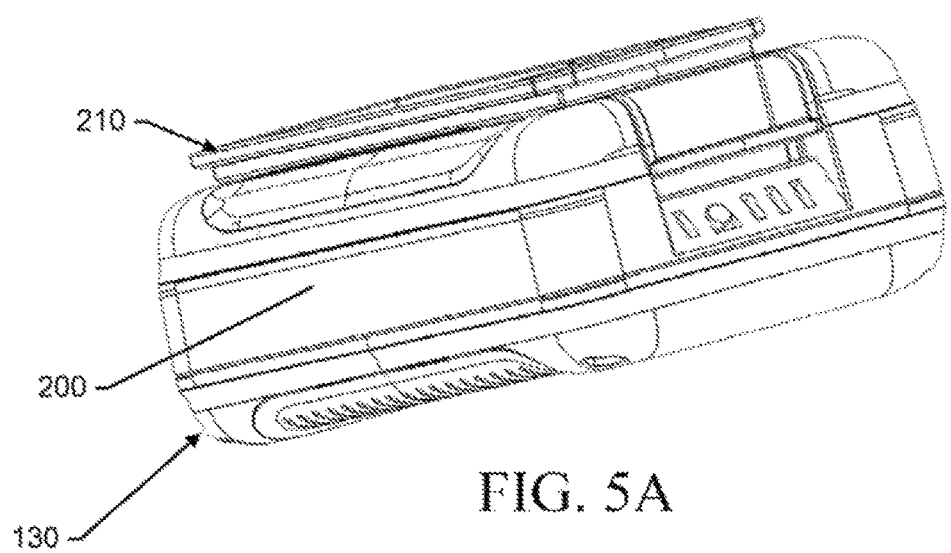
FIG. 5A illustrates a perspective view of the battery in isolation in accordance with an example embodiment.
Figure 5B:
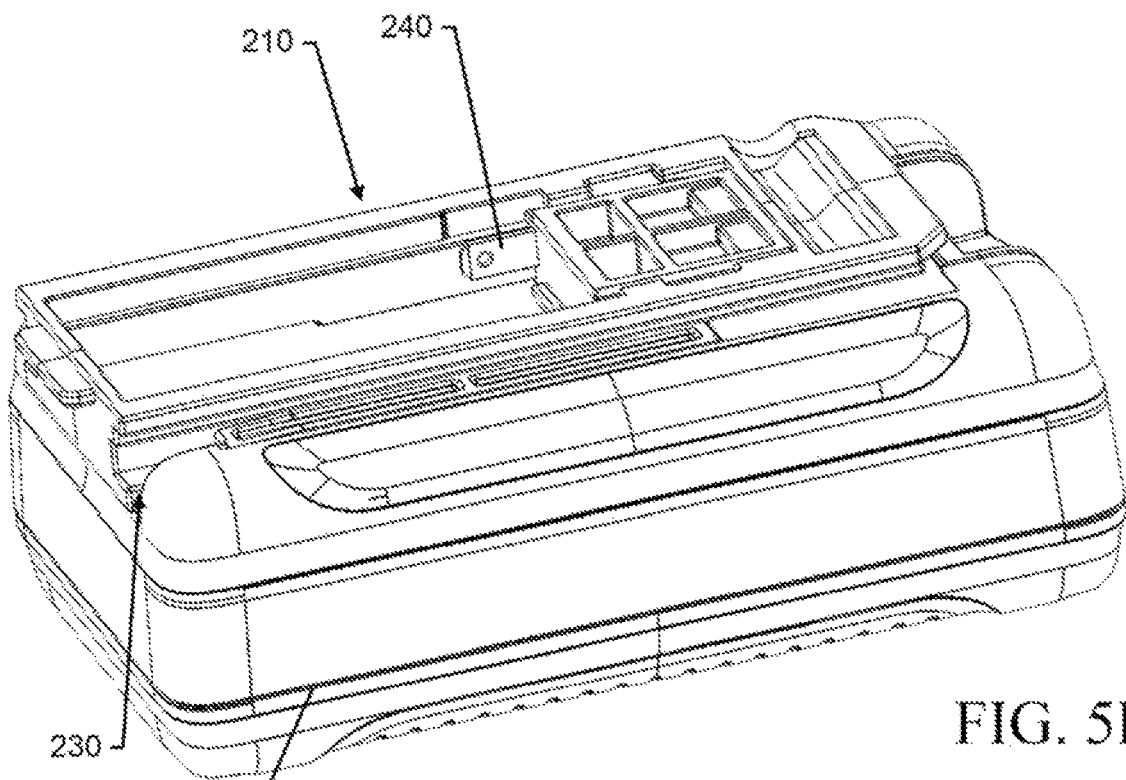
FIG. 5B illustrates an alternative perspective view of the battery to show the receiving portion of the battery in accordance with an example embodiment.
Figure 5C:
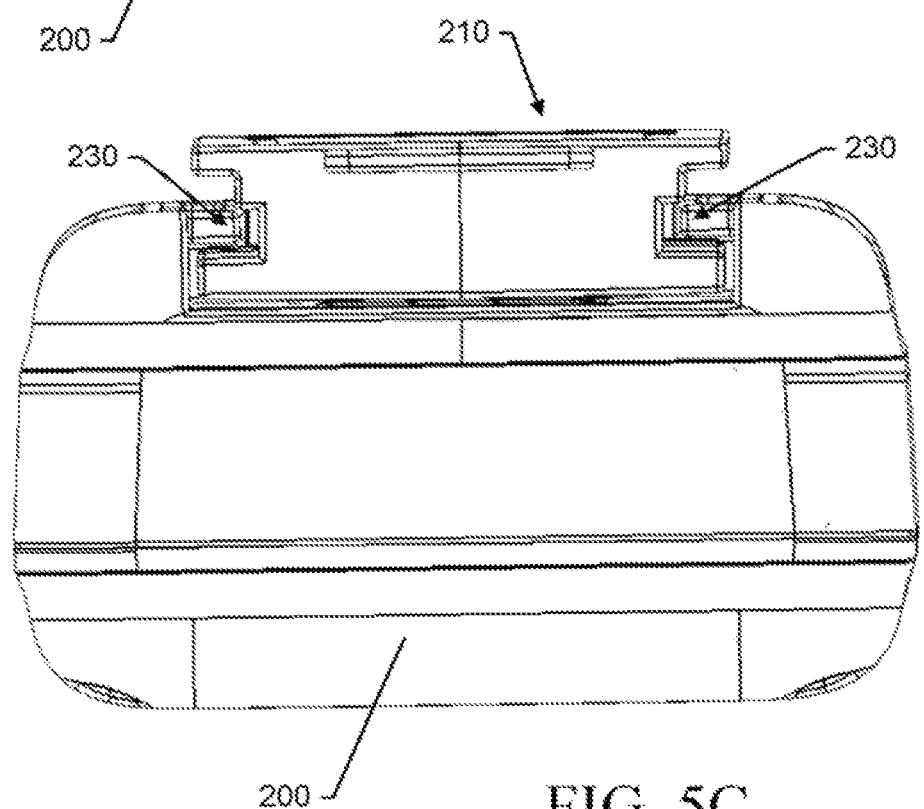
FIG. 5C illustrates a front view of the battery in accordance with an example embodiment.

The power head 120 and the battery 130 will now be described in greater detail in reference to FIGS. 4A-5C. FIG. 4A illustrates a front, right side, perspective view of the power head 120 with the battery 130 removed. FIG. 4B illustrates a perspective view from the opposite side, but with the left half of the power head housing 122 removed. FIG. 4C illustrates a front, left side, perspective view of the power head 120 with the battery 130 installed. FIG. 4D illustrates a rear perspective view of the power head 120 with the battery 130 removed to show how the battery 130 and power head 120 mate with each other. FIG. 5A illustrates a rear perspective view of the battery 130. FIG. 5B illustrates a top side perspective view of the battery 130, and FIG. 5C illustrates a front view of the battery 130 in accordance with an example embodiment.

Referring now to FIGS. 4A-5C, it can be appreciated that the motor 140 is disposed at a portion of the power head housing 122 that is forward of, but adjacent to, a battery receiver 160 formed in the rear portion of the power head housing 122. When inserted into the battery receiver 160, the battery 130 has a longitudinal centerline that is parallel to an axis of the motor (which is coaxial with the common axis 148). The battery 130 is disposed beneath a rear portion of the handle 124, while the motor 140 is disposed beneath the front portion of the handle 124. Meanwhile, the handle 124 is relatively long (e.g., about the width of two hands) to define different operator grip positions (one forward and over the motor 140, and the other rearward and over the battery 130) to create an opportunity to achieve different ergonomics when different tool attachments are attached to the power head 120. Thus, the operator can hold the handle 124 (and ultimately the multi-tool 100) in a way that shifts the way the weight distribution of the power head 120 will be arranged about a potential pivot point formed by the hand of the operator for corresponding different tool attachments.

With the battery 130 removed, the main weight contributor for the power head 120 may be the motor 140. Thus, without the battery 130, the power head 120 may tend to have a forward lean when one hand of the operator is on the handle 124. However, when the battery 130 is inserted, the weight of the motor 140 is offset by the weight of the battery 130, and thus the position of the hand of the operator (i.e., at the front or back of the handle 124) may determine any tendency of the power head 120 to lean forward, backward, or not at all. Meanwhile, the lengths, weights, and positions of the centers of gravity for each of the tool attachments is different, as is the normal position in which the multi-tool 100 will be held for operation of the multi-tool 100 with each respective attachment. Thus, the position and orientation of the battery receiver 160 to receive the battery 130 by insertion in a direction that is substantially parallel to the common axis 148 (and the axis of the motor 140) ensures a relatively compact structure for the power head 120, but also a structure that is adaptable to use with different tool attachments while keeping good ergonomics.

The battery 130 includes a housing 200 that houses one or more individual battery cells. As can be seen in FIG. 3, the battery cells may lie in the housing 200 such that the longitudinal centerlines of the cells are parallel to each other, but substantially perpendicular to the common axis 148. Various ones of the battery cells may be connected in series and/or parallel to define any desirable operating voltage (e.g., 20V), and the battery cells may also be connected to output power terminals that operably couple to corresponding terminals of the power head 120 when the battery 130 is mated with the power head 120.

As shown in FIGS. 4D, 5A, 5B and 5C, a top portion of the housing 200 may be operably coupled to a receiving portion 210 that is configured to mate with a rail structure 220 that is provided at a rear portion of the power head 120 in the battery receiver 160. The rail structure 220 may include longitudinally extending rails (e.g., L shaped, outwardly facing first rail 222 and second rail 224) that extend substantially parallel to the common axis 148. The rail structure 220 may fit inside the receiving portion 210 of the battery 130 and slidably engage with guide channels 230 formed proximate to an intersection of the receiving portion 210 the housing 200. The interface between the first and second rails 222 and 224 and the guide channels 230 may enable the battery 130 to be slid into the power head 120 in an insertion direction that is parallel to the common axis 148. The battery 230 may be slid to the point at which electrical contact is made between contacts 240 on the battery 130 and corresponding contacts 242 on the rail structure 220. Electrical power may then be transferred from the battery 130 to the motor 140 under the control of the control unit and/or the power button 128 or operating member 126.

Figure 6C:
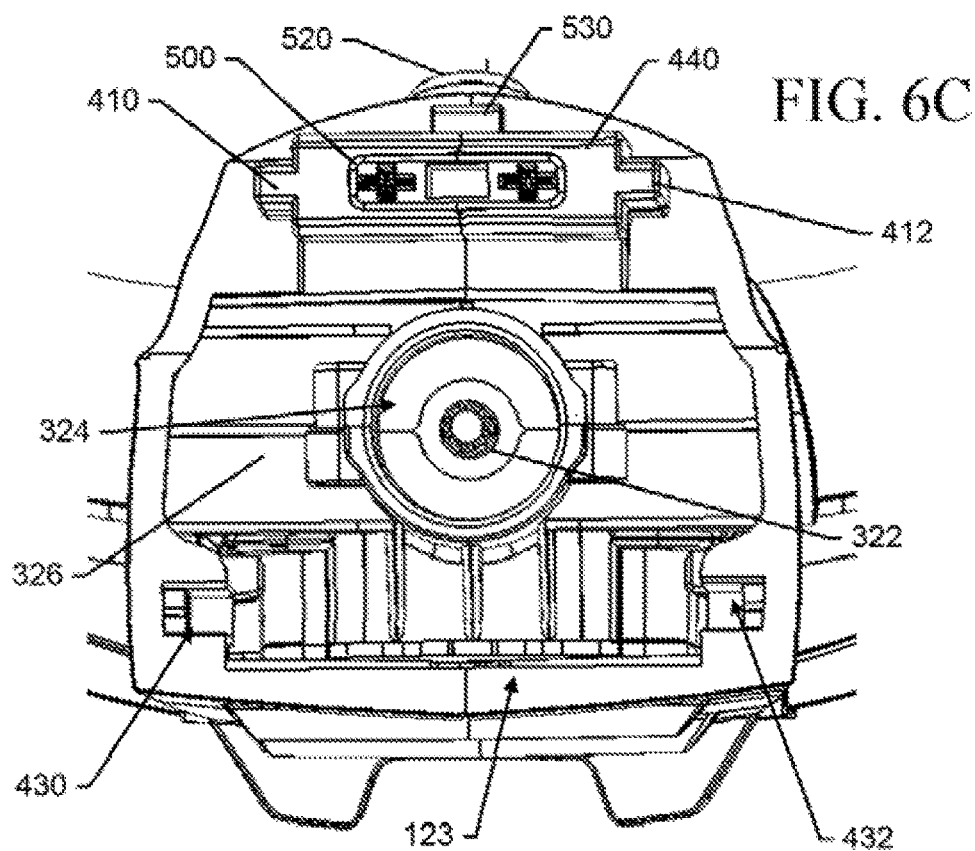
FIG. 6C illustrates a rear view of the hedge trimmer attachment in isolation in accordance with an example embodiment.
Figure 6D:
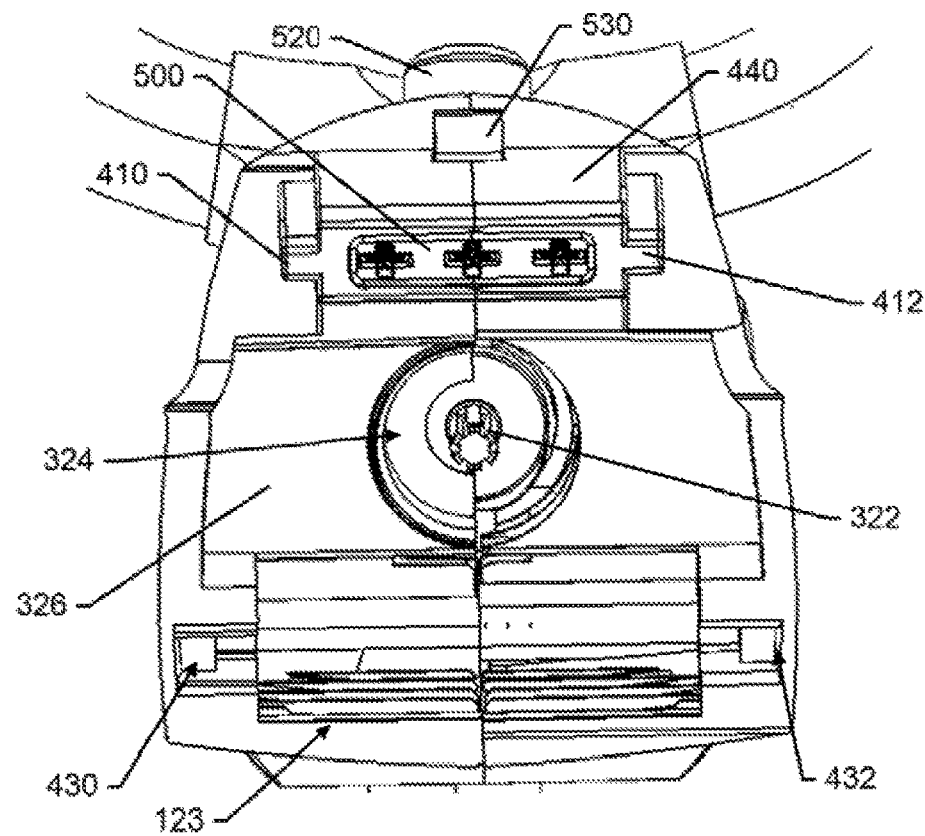
FIG. 6D illustrates a rear view of the string trimmer attachment in isolation in accordance with an example embodiment.

FIG. 6, which is defined by FIGS. 6A, 6B, 6C and 6D, shows views of the power head mating interface 121 of the power head 120, and views of the tool mating interface 123 of respective ones of the tool attachment. In this regard, FIG. 6A illustrates a front view of the power head 120 looking along the common axis 148 into the power head mating interface 121 of the power head 120. FIG. 6B illustrates a rear view of the blower attachment 110 looking along the common axis 148 into the tool mating interface 123 on the blower attachment 110. FIG. 6C illustrates a rear view of the hedge trimmer attachment 106 looking along the common axis 148 into the tool mating interface 123 on the hedge trimmer attachment 106. FIG. 6D illustrates a rear view of the string trimmer attachment 108 looking along the common axis 148 into the tool mating interface 123 on the string trimmer attachment 108.

Referring now primarily to FIGS. 6A, 6B, 6C and 6D, the power head mating interface 121 of the power head 120, and the tool mating interface 123 of the tool attachments will be described to facilitate an understanding of how such interfaces meet with and connect to each other. In this regard, the mating interfaces (i.e., the power head mating interface 121 and the tool mating interface 123) each include respective components of a drive power transfer assembly, an electronic assembly, and a physical mating assembly. The drive power transfer assembly, the electronic assembly, and the physical mating assembly may each include components that are split between the tool attachments and the power head 120, where the components only engage each other to render the multi-tool 100 operable when the mating interfaces (and corresponding assemblies thereof) are engaged.

The drive power transfer assembly is defined by a drive provider portion 300 disposed at the power head 120 and a drive receiver portion 320 disposed at the tool attachment. The drive provider portion 300 includes a driving portion 302 of the shaft 150. The driving portion 302 may be operably coupled to and/or extend from the motor 140 and may protrude from an interface plate 304 that may be embedded or otherwise provided in a front wall 306 that is part of the power head housing 122 and that is disposed forward of the motor 140. The interface plate 304 may include one or more holes or orifices provided therein to allow air to pass to or from a space defined between the power head 120 and the tool attachment when the mating interfaces are engaged to a space inside the power head housing 122 where the motor 140 is housed. The power head housing 122 may also include louvers on opposing right and left sides thereof (proximate to the motor 140), and each of the attachment housings may include louvers 308 at a bottom portion thereof, proximate to the mating interfaces, in order to allow cooling air to flow between the attachment housing and the power unit housing 122 for cooling of the motor 140.

The drive provider portion 300 may also include a guide sleeve 310 that extends coaxial with the driving portion 302 (and coaxial with the common axis 148). The guide sleeve 310 may be a hollow cylinder that extends away from the interface plate 304 and has a length and diameter that are each longer than the length and diameter of the driving portion 302.

The drive receiver portion 320 of each of the tool mating interfaces 123 of respective ones of the tool attachments may include similarly structured (and functioned) components. However, slight differences in form (and perhaps also function) may be different between different tool attachments. In an example embodiment, the drive receiver portion 320 may include a driven portion 322 of the shaft 150 that is configured to be operably coupled to the driving portion 302 when the mating interfaces are engaged. The driven portion 322 may extend rearward from an end of the shaft 150 that extends away from the fan 142. The driven portion 322 may be disposed within a guide receiver 324 formed in a rear mating surface base 326 of each of the attachment housings. The guide receiver 324 may be a cylindrically shaped depression formed in the rear mating surface base 326. In an example embodiment, the depth of the guide receiver 324 from the rear mating surface base 326 may be substantially equal to the length of the guide sleeve 310. Additionally, in some cases, the length of the driven portion 322 may be substantially equal to the depth of the guide receiver 324 (and the length of the guide sleeve 310). Moreover, the depth and shape of the guide receiver 324 may substantially match the length and shape of the guide sleeve 310. However, the guide sleeve 310 may have an outside diameter that is slightly less than an inside diameter of the guide receiver 324.

The complementary shapes of the guide receiver 324 and guide sleeve 310 enable the guide sleeve 310 to be inserted into the guide receiver 324 to guide the mating of the driving portion 302 with the driven portion 322 of the shaft 150 when the mating interfaces are engaged. The shaft 150 may then (i.e., when the driving portion 302 and the driven portion 322 are engaged) pass from the motor 140 to the drive receiver portion 320 of the attachment portion. For example, in the context of the blower attachment 110, the shaft 150 may pass from the fan 142 through the intake screen 156 into the intake chamber 152 (albeit within the shaft housing 158) and through the rear wall 154 of the intake chamber 152. From that point, the shaft 150 may pass through the rear mating surface base 326 and into the guide receiver 324 and guide sleeve 310 (which will be coaxial with the guide sleeve 310 inserted into the guide receiver 324), where the driven portion 322 and driving portion 302 actually engage each other. The shaft 150 then continues through the interface plate 304 to the motor 140. In an example embodiment, the driven portion 322 may include longitudinally extending grooves formed in the outer surface of the cylindrical structure that forms the driven portion 322. The driving portion 302 may be a substantially hollow cylinder (or at least terminate as such). In some embodiments, the interior of the driving portion 302 may include longitudinally extending protrusions or teeth that engage corresponding ones of the grooves formed in the driven portion 322. The positions of the grooves and protrusions could, of course, be reversed in some example embodiments.

When the motor 140 operates (e.g., under the control of the control unit), the motor 140 turns the shaft 150. In particular, the motor 140 turns the driving portion 302 of the shaft 150 and the driving portion 302 turns the driven portion 322. The driven portion 322 then provides an output to be used by the working assembly of the tool attachment that is operably coupled to the power unit 120 at that time. For example, if the multi-tool 100 is configured with the blower attachment 110, then the driven portion 322 may directly turn the fan 142 to draw air into the intake chamber 152 and expel the air from the blower tube 144. The drive power transfer assembly is therefore configured to enable the drive provider portion 300 disposed at the power head 120 to be mated with the drive receiver portion 320 disposed at the blower attachment 110 when the mating interface is engaged to provide mechanical (in this case rotary) power from one separable component (i.e., the power head 120) to another separable component (i.e., the blower attachment 110). In this regard, the drive power transfer assembly is configured to operably couple two portions of a split shaft to combine such portions into a working shaft (i.e., shaft 150) that extends through the intake chamber 152 to provide a blower structure that places the air intake between the motor 140 and the fan 142. However, the drive power transfer assembly is configured to ensure the proper alignment of the two portions of the split shaft by ensuring that the guide sleeve 310 inserts into the guide receiver 324 before the driving portion 302 of the shaft 150 engages the driven portion 322 of the shaft 150. Thus, the teeth and/or grooves on the driven portion 322 and the driving portion 302 can be less susceptible to damage, and the driven portion 322 and driving portion 302 can also avoid damage (e.g., due to bending or deformation) that might occur if mating attempts were made without proper alignment.

Figure 7A:
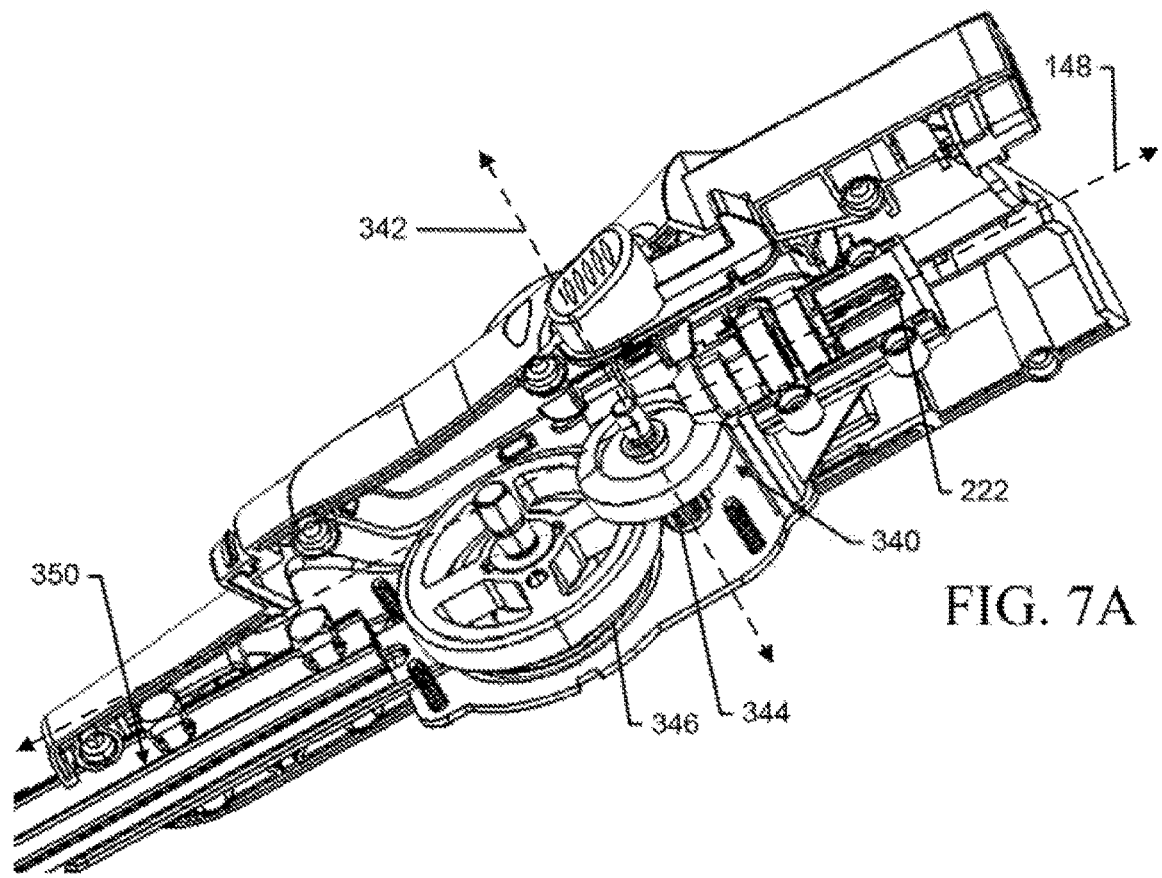
FIG. 7A illustrates a perspective view of the hedge trimmer attachment with part of its housing removed in accordance with an example embodiment.
Figure 7B:
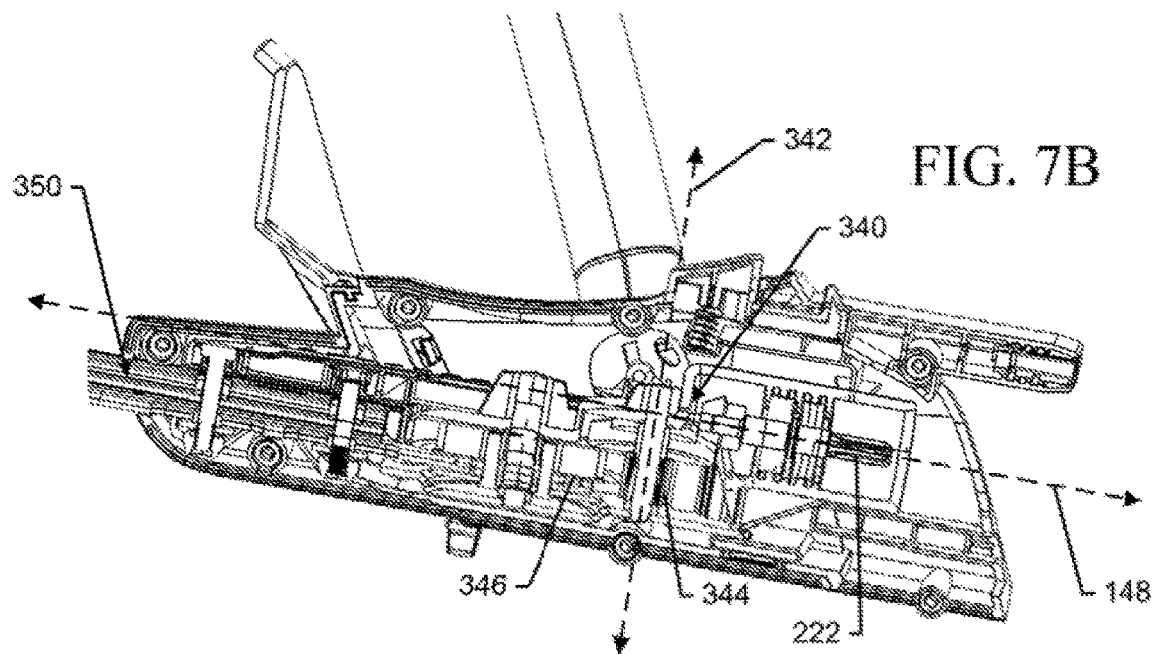
FIG. 7B is a cross section view of the hedge trimmer attachment in accordance with an example embodiment.

In the context of the hedge trimmer attachment 106, FIGS. 7A and 7B illustrate the components driven by the drive receiver portion 320 when the driving portion 302 rotates the driven portion 322. In this regard, the driven portion 322 may be operably coupled to a beveled gear set 340 to convert the rotary movement of the driven portion 322 of the shaft 150, which rotates about the common axis 148, into rotary movement about an axis 342 that is substantially perpendicular to the common axis 148. The gear among the beveled gear set 340 that rotates about the axis 342 may be larger than the gear that is coaxial with the common axis 148 in order to slow the output relative to the input rotation speed. A gear 344 that is coaxial with the axis 342 may then transfer the rotary movement about the axis 342 to a larger gear 346 that rotates about another axis that is substantially parallel to the axis 342 and perpendicular to the common axis 148 to slow the speed of rotation of the larger gear 346 relative to the speed of rotation of the larger gear 346 even further relative to the input rotation speed of the driven portion 322. From the larger gear 346, a sliding yoke with a slot, a scotch yoke, or another motion converter configured to convert rotational motion into linear motion may be employed to move one or both blades of blade assembly 350.

The hedge trimmer attachment 106 therefore takes the rotary input provided from the power head 120, which rotates about the common axis 148, and converts such rotary input into a linear work function output by moving the blades of the blade assembly 350 linearly in a direction substantially parallel to the common axis 148. Thus, the hedge trimmer attachment 106 provides a speed change to the rotary input and also changes the direction of the output work function. Meanwhile, the blower attachment 110 described above takes the rotary input provided from the power head 120 and directly converts the rotary input into a rotary output (by moving the fan 142) that is coaxial with the common axis 148 and the rotary input. Thus, the blower attachment 110 preserves the speed (i.e., no speed change) of the rotary input and also preserves the direction of the output work function. The string trimmer attachment 108, as will be seen below, preserves the speed of the rotary input, but changes the direction.

Figure 8A:
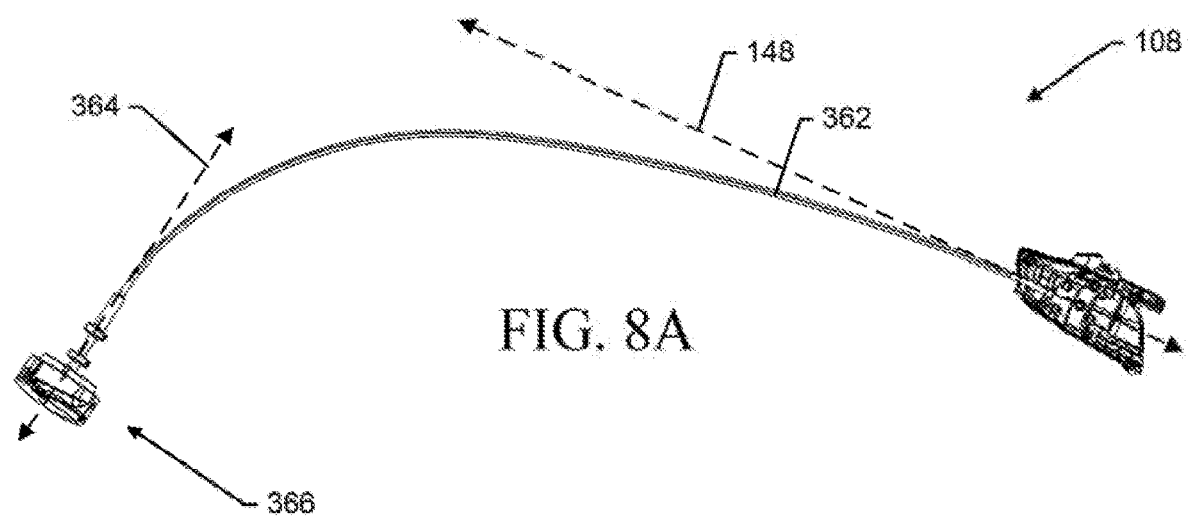
FIG. 8A illustrates a perspective view of the string trimmer attachment with part of its housing and the tube removed in accordance with an example embodiment.
Figure 8B:
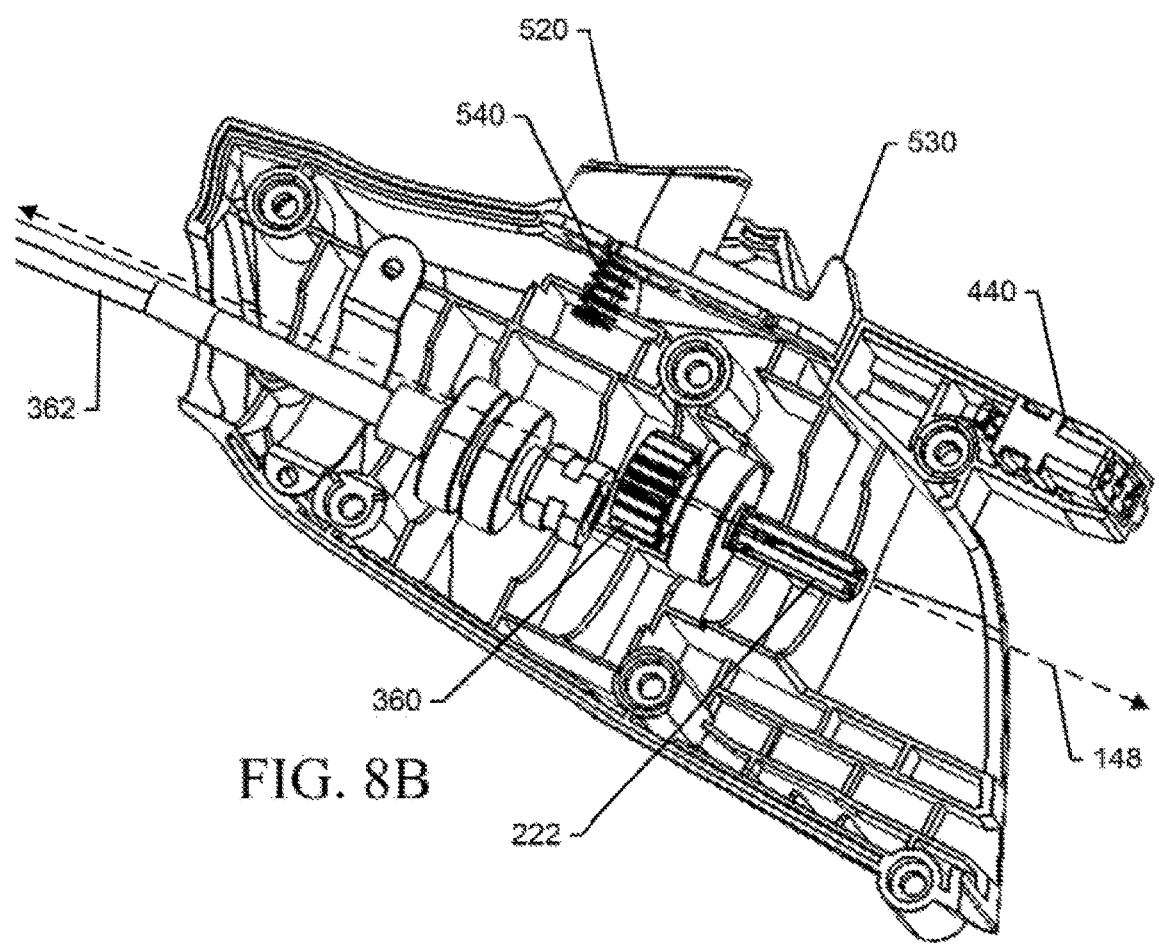
FIG. 8B is a cross section view of the string trimmer attachment in accordance with an example embodiment.

FIGS. 8A and 8B illustrate the components driven by the drive receiver portion 320 when the driving portion 302 rotates the driven portion 322 in the string trimmer attachment 108. In this regard, the driven portion 322 may be operably coupled to a turning gear 360 that rotates about the common axis 148 with the rotary movement of the driven portion 322 of the shaft 150. The turning gear 360 may be operably coupled to a flex drive assembly 362, which is operably coupled to a cutting head 366 of the string trimmer attachment 108. The flex drive assembly 362 may pass through the tube that extends between the portion of the string trimmer attachment 108 that connects to the cutting head 366 to transfer the rotary input received at the driven portion 322 to a rotary output that rotates about a different axis. In this regard, as seen in FIG. 8A, the axis 364 of the cutting head 366 is substantially different (e.g., about 90 different) than the common axis 148. Although the flex drive assembly 362 may turn at the same speed (and also turn the cutting head 366 at the same speed) as the rotary input provided at the driven portion 322, it is also possible to alter the speed with gears at either end of the flex drive assembly 362.

The physical mating assembly may provide further structures for ensuring proper alignment of the power head 120 and the tool attachments for engagement of the mating interfaces. Moreover, the physical mating assembly may also provide the structures that enable the mating interfaces to transition between an engaged state (holding the power head 120 and the selected tool attachment together to operably couple them in a manner that allows the multi-tool 100 to be operable), and a disengaged state (where the power head 120 and selected tool attachment can be separated from each other to permit mating with a different tool attachment).

Figure 9C:
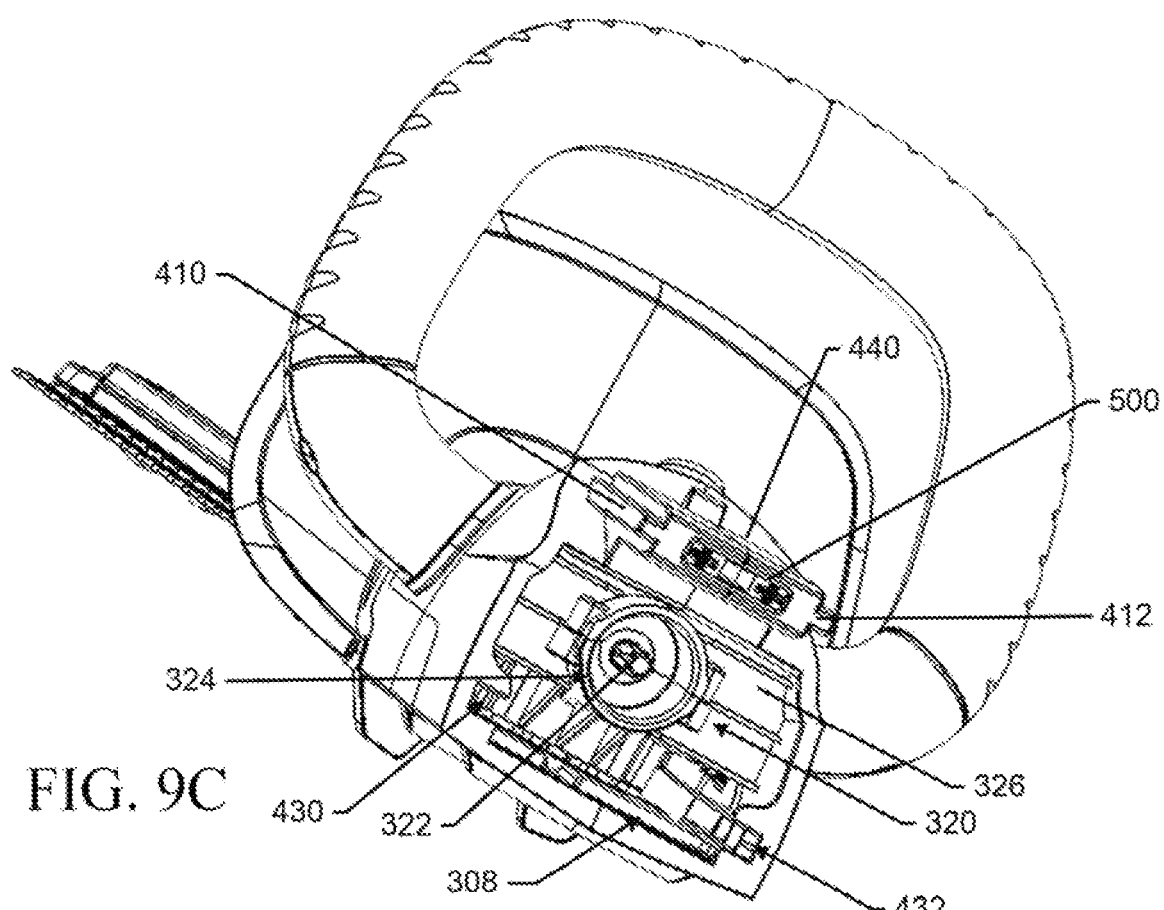
FIG. 9C illustrates a close in, perspective view of the mating interface of the hedge trimmer attachment in accordance with an example embodiment.
Figure 9D:
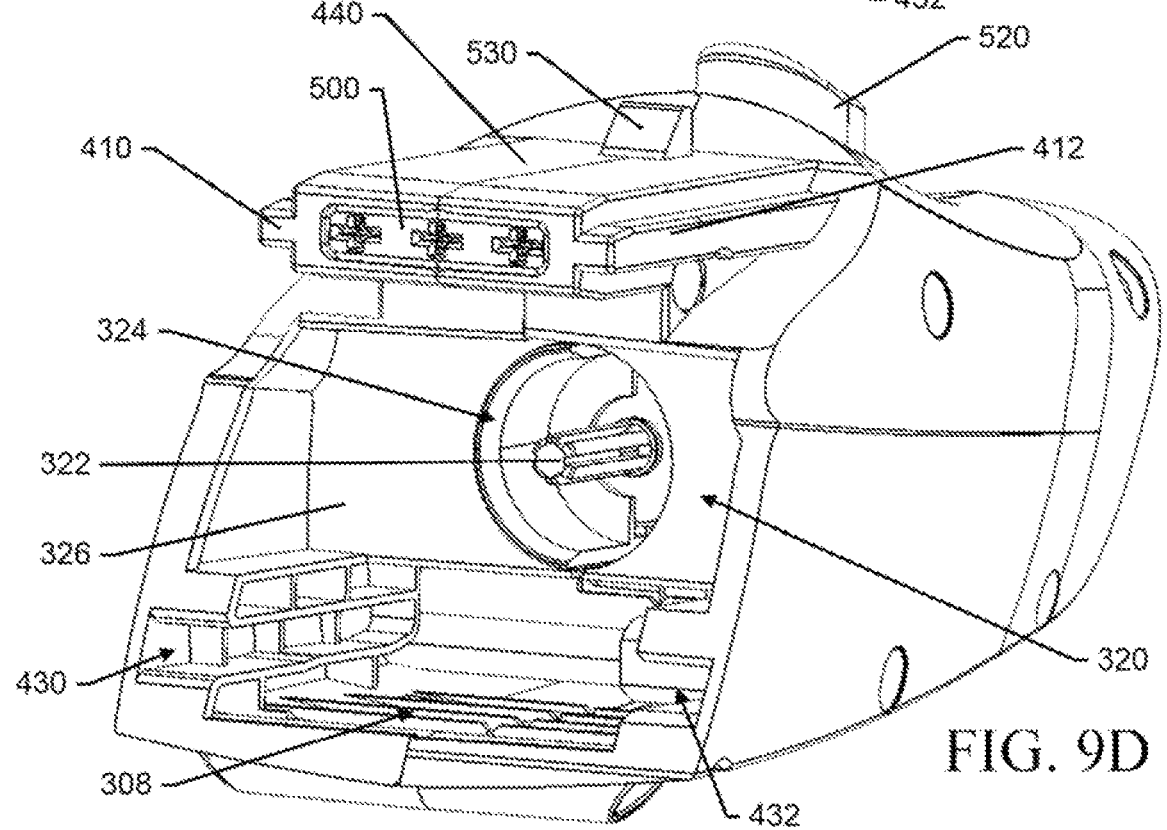
FIG. 9D is a close in, perspective view of the mating interface of the string trimmer attachment in accordance with an example embodiment.
Figure 9E:
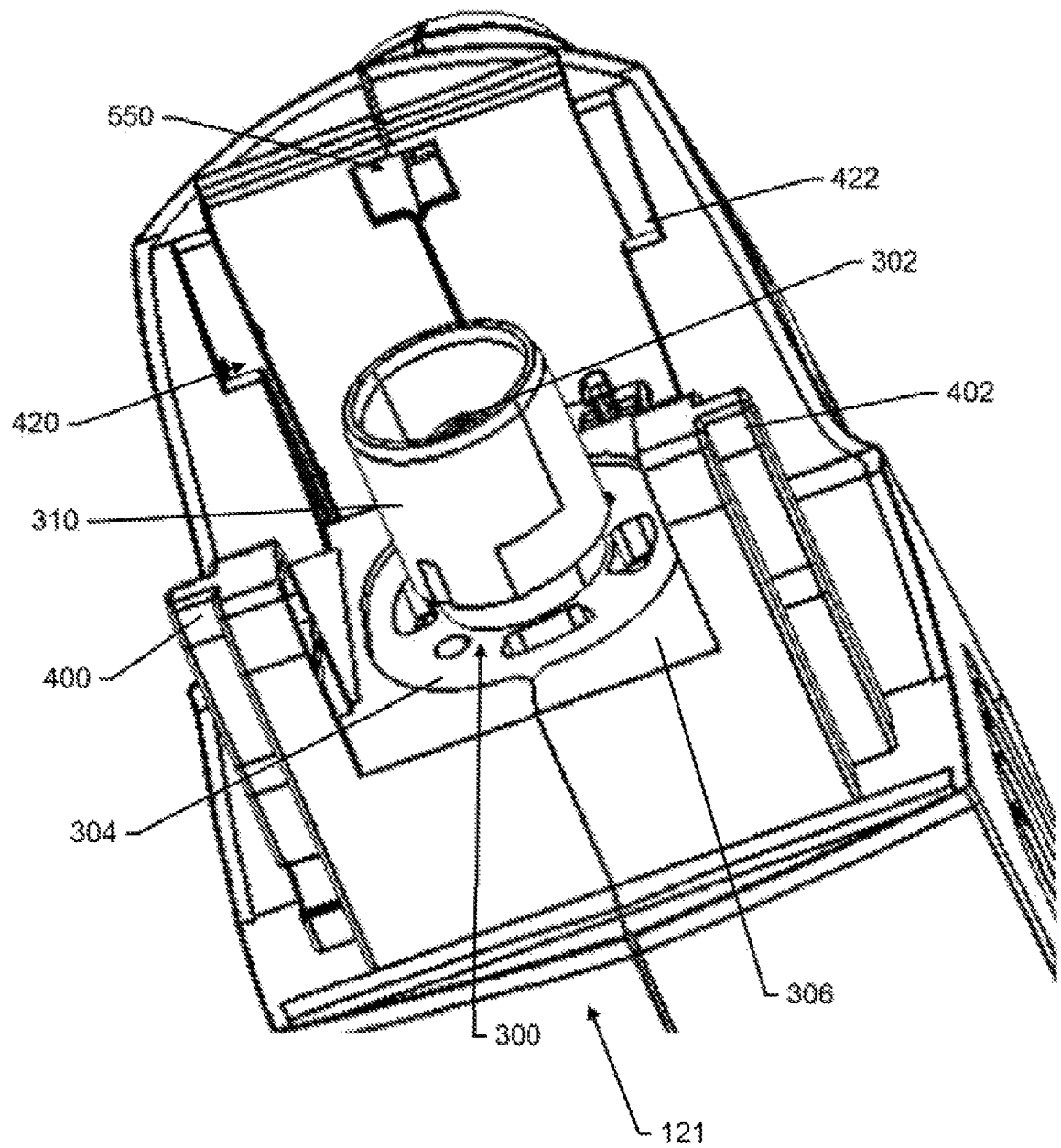
FIG. 9E illustrates a perspective view of the mating interface of the power head from below in accordance with an example embodiment.

In an example embodiment, the physical mating assembly may be primarily comprised of an alignment and support assembly, and an engagement assembly. The alignment and support assembly may (similar to the guide sleeve 310 and the guide receiver 324) ensure that certain other structures of the electronic assembly and/or the drive power transfer assembly are properly aligned before engagement thereof. The alignment and support assembly may also ensure that the power head 120 and the selected tool attachment are rigidly and securely mated to each other so that when the engagement assembly engages the power head 120 and selected tool attachment to each other the multi-tool 100 is operable as one structurally stable platform. Meanwhile, the engagement assembly locks the power head 120 and the tool attachment together when in the engaged state. Portions of the alignment and support assembly that are disposed on the power head 120 will be described primarily in reference to FIGS. 4A, 4B, 4C, 6A and 9A. Portions of the alignment and support assembly that are disposed on the blower attachment 110 will be described primarily in reference to FIGS. 6B and 9B. Portions of the alignment and support assembly that are disposed on the hedge trimmer attachment 106 will be described primarily in reference to FIGS. 6C and 9C. Portions of the alignment and support assembly that are disposed on the string trimmer attachment 108 will be described primarily in reference to FIGS. 6D and 9D.

The alignment and support assembly includes a first rail assembly (including rails 400 and 402) and a second rail assembly (including rails 410 and 412), and a corresponding first set of guide grooves (including grooves 420 and 422) and second set of guide grooves (including grooves 430 and 432), where the first rail assembly 400, 402 is configured to slidably engage the first set guide grooves 420, 422 and the second rail assembly 410, 412 is configured to slidably engage the second set of guide grooves 430, 432. The alignment and support assembly is designed so that the power head 120 includes one rail assembly and one set of guide grooves (e.g., the first rail assembly 400, 402 and the first set of guide grooves 420, 422), and each of the tool attachments includes a complementary rail assembly and set of guide grooves (e.g., the second rail assembly 410, 412 and the second set of guide grooves 430, 432).

The first set of guide grooves 420, 422 may be disposed on the power head 120 above the guide sleeve 310, while the first rail assembly 400, 402 is disposed below the guide sleeve 310. Each of the grooves (320 and 322) of the first set of guide grooves 420, 422 may substantially mirror each other relative to a longitudinally extending plane dividing the power head 120 into substantially equal right and left halves. Similarly, each of the rails (400 and 402) of the first rail assembly 400, 402 may substantially mirror each other relative to a longitudinally extending plane dividing the power head 120 into substantially equal right and left halves.

The second set of guide grooves 430, 432 may be disposed on the blower attachment portion 110 below the guide receiver 324, while the second rail assembly 410, 412 is disposed above the guide receiver 324. Each of the grooves (430 and 432) of the second set of guide grooves 430, 432 may substantially mirror each other relative to a longitudinally extending plane dividing the blower attachment portion 110 into substantially equal right and left halves. Similarly, each of the rails (410 and 412) of the second rail assembly 410, 412 may substantially mirror each other relative to a longitudinally extending plane dividing the blower attachment portion 110 into substantially equal right and left halves. Moreover, the first set of guide grooves 420, 422 may be configured to engage respective ones of the second rail assembly 410, 412, while the second set of guide grooves 430, 432 are configured to engage respective ones of the first rail assembly 400, 402. The first rail assembly 400, 402 and the second rail assembly 410, 412 each extend substantially parallel to each other and to the common axis 148. The first set guide grooves 420, 422 and the second set of guide grooves 430, 432 each also extend substantially parallel to each other, to the first rail assembly 400, 402 and the second rail assembly 410, 412, and to the common axis 148.

The first rail assembly 400, 402 includes individual rails (400 and 402) that are not connected to each other in this example. Thus, the rails (400 and 402) of the first rail assembly 400, 402 are separated and spaced apart from each other. The rails (400 and 402) of the first rail assembly 400, 402 extend substantially perpendicularly away from the front wall 306 by a distance that is substantially equal to a distance that the grooves (420 and 422) of the first set of guide grooves 420, 422 extend into the power head 120 to reach the front wall 306.

The second rail assembly 410, 412 includes individual rails (410 and 412) that are disposed on opposite lateral sides of a protruding member 440 that extends substantially perpendicularly away from the rear mating surface base 326 and is substantially parallel to the common axis 148. Thus, the rails (410 and 412) of the second rail assembly 410, 412 are spaced apart from each other by the protruding member 440, but operably coupled to each other via the protruding member 440. The rails (410 and 412) of the second rail assembly 410, 412 also extend substantially perpendicularly away from the rear mating surface base 326 by a distance that is substantially equal to a distance that the grooves (430 and 432) of the second set of guide grooves 430, 432 extend into the tool attachment past the rear mating surface base 326. In an example embodiment, the rails (410 and 412) of the second rail assembly 410, 412 may be substantially equal in length to the grooves (430 and 432) of the second set of guide grooves 430, 432. However, both the rails (410 and 412) of the second rail assembly 410, 412 and the grooves (430 and 432) of the second set of guide grooves 430, 432 may extend beyond the rear mating surface base 326 in both directions perpendicular thereto. In some cases, the rails (410 and 412) of the second rail assembly 410, 412 may be substantially equal in length to the grooves (430 and 432) of the second set of guide grooves 430, 432 may extend past the rear mating surface base 326 in the forward direction by a distance substantially equal to a depth of the guide receiver 324.

The first rail assembly 400, 402 and the second rail assembly 410, 412 may each have a substantially T shape, where a base of the T shape is oriented to extend outward relative to the longitudinally extending planes dividing the tool attachment and power head 120 into substantially equal right and left halves. The first set of guide grooves 420, 422 and the second set of guide grooves 430, 432 may be shaped as grooves that are oriented to receive the base of the T of respective ones of the first rail assembly 400, 402 and the second rail assembly 410, 412. A distance between the rails (400 and 402) of the first rail assembly 400, 402 may be slightly less than (but substantially equal to) a distance between the grooves (420 and 422) of the first set of guide grooves 420, 422. Similarly, a distance between the rails (410 and 412) of the second rail assembly 410, 412 may be slightly less than (but substantially equal to) a distance between the grooves (430 and 432) of the second set of guide grooves 430, 432. However, the distance between the rails (410 and 412) of the second rail assembly 410, 412 may be less than the distance between the rails (400 and 402) of the first rail assembly 400, 402. The different distances (i.e., widths) may ensure that the operator will not attempt to engage the tool attachment to the power head 120 upside down or in any orientation other than the proper orientation.

During engagement, the first rail assembly 400, 402 may engage the second set of guide grooves 430, 432 at approximately the same time that the second rail assembly 410, 412 engages the first set of guide grooves 420, 422. In any case, sliding engagement between these components will be prevented or at least very limited until both sets of rails and grooves are properly aligned. This nearly simultaneous engagement (or at least nearly simultaneous sliding engagement) ensures proper alignment of components of the drive power transfer assembly and the electronic assembly to avoid damaging or breaking such components. In particular, for example, the first rail assembly 400, 402 must slidably engage the second set of guide grooves 430, 432 for at least some distance while the second rail assembly 410, 412 also slidably engages the first set of guide grooves 420, 422 for a similar distance before the guide sleeve 310 begins to be inserted into the guide receiver 324. This sliding engagement must then continue for at least a given distance before the driven portion 322 and the driving portion 302 of the shaft 150 engage each other. Thus, example embodiments provide for the sliding engagement of components the physical mating assembly before any engagement of components of the drive power transfer assembly and the electronic assembly. Moreover, example embodiments define an ordered sequence to the engagement of specific components to limit the potential for damaging components.

The engagement assembly may be configured to lock the selected tool attachment to the power head 120 when in the engaged state. In an example embodiment, the engagement assembly may include an operator (e.g., button 520) that is disposed on the tool attachment and protrudes from a portion of the housing of the tool attachment (e.g., at a top portion thereof). The button 520 may be operably coupled to a locking projection 530 that extends from a portion of the protruding member 440 to move the locking projection 530 whenever the button 520 moves. In some cases, the button 520 may be configured to be depressed against a biasing force provided by a biasing member (e.g., spring 540). Accordingly, when depressed, the button 520 may be retracted into the housing of the tool attachment (and protruding member 440) and the locking projection 530 may correspondingly be retracted into the protruding member 440. However, when the button 520 is released, the spring 540 may urge the button 520 and the locking projection 530 upward and out of the housing of the tool attachment and protruding member 440, respectively.

Meanwhile, the power head housing 122 may include a receiving slot 550 disposed in an interior top portion thereof that corresponds to a position of the locking projection 530 when the selected tool attachment is mated with the power head 120 via engagement of the components of the alignment and support assembly in the manner described above. Thus, for example, while the first rail assembly 400, 402 slidably engaged the second set of guide grooves 430, 432 and the second rail assembly 410, 412 also slidably engages the first set of guide grooves 420, 422 to draw the power head housing 122 closer to the housing of the selected tool attachment, the interior top portion of the power head housing 122 may exert a force on the locking projection 530 to overcome the spring 540 and retract the locking projection 530 into the protruding member 440 to enable continued sliding between the rail assemblies and guide grooves until the locking projection 530 aligns with the receiving slot 450. When the locking projection 530 aligns with the receiving slot 450, the spring 540 may force the locking projection 530 into the receiving slot 450 to lock the power head housing 122 to the housing of the selected tool attachment in the engaged state. When separation of the power head housing 122 and the housing of the selected tool attachment is desired, the operator may depress the button 420, as described above, to withdraw the locking projection 530 from the receiving slot 450 and permit the components of the alignment and support assembly described above to be slidingly moved relative to each other in a direction that separates the power head 120 from the selected tool attachment until the components no longer engage each other and the power head 120 and the selected tool attachment are separated from each other.

The electronic assembly may include one portion at each of the power head 120 and the selected tool attachment. In this regard, the electronic assembly may include a first contact assembly 500 disposed at the selected tool attachment and a second contact assembly 510 disposed at the power head 120. The first and second contact assemblies 500 and 510 may be positioned such that they engage each other when the power head housing 122 and the housing of the selected tool attachment are in the engaged state. One of the first contact assembly 500 or the second contact assembly 510 may include male electrical contacts, and the other may include female electrical contacts configured to receive the male electrical contacts. Which one of the first contact assembly 500 or the second contact assembly 510 includes respective ones of the male/female contact portions does not matter. However, it should be appreciated that the male and female contact portions do not engage each other until the alignment provided by the alignment and support assembly is established in the manner described above.

In the examples shown, male contacts are provided on the second contact assembly 510 on the power head 120. Accordingly, the male contacts are inset within the power head housing 122 and relatively protected from bending or other fouling or damage. Meanwhile the female contacts are provided on the first contact assembly 500, which is disposed on a distal end of the protruding member 440 (e.g., between distal ends of the rails (410 and 412) of the second rail assembly 410, 412. Thus, there are no bendable or breakable components on the protruding member 440.

In an example embodiment, at least some of the contacts of the first and second contact assemblies 500 and 510 may be operably coupled to the control unit of the multi-tool 100 for the implementation of various safety features associated with operation of the multi-tool 100. In the example shown, three contacts are provided on the first and second contact assemblies 500 and 510. Within the protruding member 440 of the blower attachment 110 and the string trimmer attachment 108, one of the contacts of the first contact assembly 500 may be dead ended, and therefore essentially provide no function relative to operation of the multi-tool 100 for the corresponding male contact on the second contact assembly 510. However, the other two contacts of the first contact assembly 500 may be jumpered together within the protruding member 440 to complete an electrical circuit between the corresponding two contacts of the second contact assembly 510. The completion of this electrical circuit could be used as a safety check to prevent operation of the motor 140 unless the attachment of the power head 120 to the selected tool attachment can be confirmed (by completion of the circuit). In some embodiments, the hedge trimmer attachment 106 may be configured such that the contact that is dead ended in the blower attachment 110 and the string trimmer attachment 108 may actually provide a function (e.g., an operational function) in the corresponding other tool. In this regard, the middle contact of the first contact assembly 500 of the hedge trimmer attachment 106 may power at least one operational function of the hedge trimmer attachment 106 when operably coupled to the male contacts of the second contact assembly 510.

A multi-tool configured to be fitted with multiple different tool attachments is provided. The multi-tool includes a power head including a power head housing having a handle operably coupled thereto, a tool attachment configured to perform a work function and that is alternately separable from and operably coupled to the power head, a motor disposed in the power head housing, a battery configured to be operably coupled to the motor to selectively power the motor, a drive provider portion disposed at the power head, and a drive receiver portion disposed at the tool attachment. The drive provider portion includes a driving portion of a shaft operably coupled to the motor, and the drive receiver portion includes a driven portion of the shaft. The driving portion, the drive receiver portion, and the motor share a common axis. The power head receives the battery at an opposite end of the power head housing relative to an end of the power head housing at which the motor is located, and the handle extends from a first portion of the power head housing above the motor to a second portion of the power head housing above the battery.

In some embodiments, the features or operations of the multi-tool described above may be augmented or modified, or additional features or operations may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, (1) the battery includes a housing having a receiving portion configured to operably coupled to a rail structure that is provided at a battery receiver disposed at a rear portion of the power head. In some cases, (2) the tool attachment includes a blower attachment, a hedge trimmer attachment or a string trimmer attachment. In an example embodiment, (3) the tool attachment includes a plurality of different tool attachments that each perform a respective different work function. A first work function of a first tool attachment may include a first rotary output generated based on a rotary input provided via operable coupling of the drive portion and the driven portion where the first rotary output is coaxial with the rotary input. A second work function of a second tool attachment may include a second rotary output generated based on the rotary input. The second rotary output may be non-coaxial with the rotary input. A third work function of a third tool attachment may include a linear output generated based on the rotary input. In some examples, (4) the first tool attachment, the second tool attachment and the third tool attachment each may include similar instances of a tool mating interface configured to mate with a power head mating interface of the power head. In some embodiments, (5) at least one of the first work function, the second work function or the third work function includes a speed change relative to a speed of the rotary input, and at least another of the first work function, the second work function or the third work function does not include a speed change relative to the speed of the rotary input. In some cases, (6) the tool mating interface comprises an electrical interface including a first contact assembly disposed at the tool attachment, and a second contact assembly disposed at the power head, wherein the first and second contact assemblies interface with each other to provide a safety feature of the multi-tool. In some examples, (7) the safety feature comprises disabling operation of the motor (140) unless the first and second contact assemblies are in electrical contact with each other. In an example embodiment, (8) at least one tool attachment (includes one or more contacts of the first contact assembly that are dead ended. In some cases, (9) at least one tool attachment includes a contact of the first contact assembly enabling at least one operational function of the at least one tool attachment when operably coupled to the second contact assembly.

In some embodiments, any or all of (1) to (9) may be employed in addition to the optional modifications or augmentations described below. For example, in some embodiments, (10) the battery may be inserted into the power head in a direction substantially parallel to the common axis. Alternatively or additionally, (11) the battery may have a longitudinal centerline that is substantially aligned with the common axis responsive to insertion of the battery into the power head. Alternatively or additionally, (12) the driven portion and the driving portion may be configured to engage each other responsive to the power head and the tool attachment being in an engaged state. A guide sleeve may be disposed coaxial with the driving portion, and a guide receiver may be disposed coaxial with the driven portion. The guide sleeve may be configured to fit within the guide receiver during transition of the power head and the tool attachment to the engaged state. Alternatively or additionally, (13) a length of the guide sleeve may be substantially equal to a depth of the guide receiver. Alternatively or additionally, (14) the length of the guide sleeve may be longer than a length of the driving portion.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A multi-tool comprising:
a power head comprising a power head housing having a handle operably coupled thereto;
a tool attachment configured to perform a work function, the tool attachment being removably operably coupled to the power head;
a motor disposed in the power head housing;
a battery configured to be operably coupled to the power head housing and to selectively power the motor;
a drive provider portion disposed at the power head, the drive provider portion including a driving portion of a shaft operably coupled to the motor; and
a drive receiver portion disposed at the tool attachment, the drive receiver portion comprising a driven portion of the shaft,
wherein the driving portion, the drive receiver portion, and the motor share a common axis,
wherein the power head receives the battery at an opposite end of the power head housing relative to an end of the power head housing at which the motor is located,
wherein the handle extends from a first portion of the power head housing proximate to the motor to a second portion of the power head housing proximate to the battery,
wherein the battery comprises a housing having a receiving portion configured to be operably coupled to a rail structure that is provided at a battery receiver disposed at a rear portion of the power head,
wherein the tool attachment comprises one of a plurality of different tool attachments that each performs a respective different work function,
wherein a first work function of a first tool attachment comprises a first rotary output generated based on a rotary input provided via operable coupling of the drive portion and the driven portion, the first rotary output being coaxial with the rotary input,
wherein a second work function of a second tool attachment comprises a second rotary output generated based on the rotary input, the second rotary output being non-coaxial with the rotary input,
wherein a third work function of a third tool attachment comprises a linear output generated based on the rotary input,
wherein the first tool attachment, the second tool attachment and the third tool attachment each includes a tool mating interface configured to mate with a power head mating interface of the power head,
wherein the tool mating interface comprises an electrical interface including a first contact assembly disposed at the tool attachment, and a second contact assembly disposed at the power head, wherein the first and second contact assemblies interface with each other to provide a safety feature of the multi-tool, and
wherein the safety feature comprises disabling operation of the motor unless the first and second contact assemblies are in electrical contact with each other.

2. The multi-tool of claim 1, wherein at least one of the first work function, the second work function or the third work function includes a speed change relative to a speed of the rotary input, and at least another of the first work function, the second work function or the third work function does not include a speed change relative to the speed of the rotary input.

3. The multi-tool of claim 1, wherein at least one of the first, second and third tool attachments includes one or more contacts of the first contact assembly that are dead ended.

4. The multi-tool of claim 1, wherein at least one of the first, second and third tool attachments includes a contact of the first contact assembly enabling at least one operational function of the at least one of the first, second and third tool attachments when operably coupled to the second contact assembly.

5. The multi-tool of claim 1, wherein the battery is inserted into the power head in a direction substantially parallel to the common axis.

6. The multi-tool of claim 1, wherein the battery has a longitudinal centerline that is substantially aligned with the common axis responsive to insertion of the battery into the power head.

7. The multi-tool of claim 1, wherein the driven portion and the driving portion are configured to engage each other responsive to the power head and the tool attachment being in an engaged state,
wherein a guide sleeve is disposed coaxial with the driving portion, and a guide receiver is disposed coaxial with the driven portion, and
wherein the guide sleeve is configured to fit within the guide receiver during transition of the power head and the tool attachment to the engaged state.

8. The multi-tool of claim 7, wherein a length of the guide sleeve is substantially equal to a depth of the guide receiver.

9. The multi-tool of claim 8, wherein the length of the guide sleeve is longer than a length of the driving portion.

* * * * *